United States Patent
Abedini et al.

(10) Patent No.: US 12,267,723 B2
(45) Date of Patent: Apr. 1, 2025

(54) LOAD REPORTING IN BACKHAUL COMMUNICATIONS

(71) Applicant: QUALCOMM Incorporated, San Diego, CA (US)

(72) Inventors: Navid Abedini, Basking Ridge, NJ (US); Naeem Akl, Somerville, NJ (US); Rajeev Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 519 days.

(21) Appl. No.: 17/735,478

(22) Filed: May 3, 2022

(65) Prior Publication Data

US 2023/0362715 A1 Nov. 9, 2023

(51) Int. Cl.
*H04W 24/10* (2009.01)
*H04W 28/02* (2009.01)
*H04W 56/00* (2009.01)
*H04W 88/14* (2009.01)

(52) U.S. Cl.
CPC ....... *H04W 28/0284* (2013.01); *H04W 24/10* (2013.01); *H04W 56/001* (2013.01); *H04W 88/14* (2013.01)

(58) Field of Classification Search
CPC ............. H04W 28/0284; H04W 24/10; H04W 56/001; H04W 88/14
See application file for complete search history.

(56) References Cited

U.S. PATENT DOCUMENTS

| | | | |
|---|---|---|---|
| 2023/0127924 A1* | 4/2023 | Srinivasan | H04W 28/0268 370/328 |
| 2023/0189382 A1* | 6/2023 | Haustein | H04W 76/20 370/329 |

* cited by examiner

*Primary Examiner* — Chuong A Ngo
(74) *Attorney, Agent, or Firm* — Holland & Hart LLP

(57) ABSTRACT

Methods, systems, and devices for wireless communications are described. Aspects of the disclosure relate to enhanced load reporting between network entities (e.g., provided by a distributed unit (DU) to a centralized unit (CU) or by a CU to another CU). In some examples, the CU may provide one or more triggering events which may be used by the DU (or a second CU) to trigger the provisioning of a load report to the CU. Accordingly, the DU (or second CU) may be able to initiate a load report without relying on periodic reporting criteria. In some examples, the DU may initiate a load report to the CU without being configured with triggering events. In some examples, a DU may report measurements made associated with a communications load involving communications with both a parent network entity (e.g., a CU) and at least one child network entity (e.g., a user equipment).

30 Claims, 18 Drawing Sheets

LOAD REPORTING IN BACKHAUL COMMUNICATIONS

FIELD OF TECHNOLOGY

The following relates to wireless communications, including load reporting in backhaul communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support load reporting in backhaul communications. For example, the described techniques provide for enhanced load reporting between network entities (e.g., provided by a distributed unit (DU) to a centralized unit (CU) or by a CU to another CU). In some examples, the CU may provide one or more triggering events which may be used by the DU (or a second CU) to trigger the provisioning of a load report to the CU. By providing the triggering events to the DU (or second CU), the DU (or second CU) may be able to initiate a load report without relying on periodic reporting criteria. In some examples, the DU (or second CU) may initiate a load report to the CU without being configured with triggering events. For example, the DU (or second CU) may determine criteria for autonomously reporting a load report. In some examples, the DU may indicate, to the CU, the capability of the DU to initiate load reports, and the CU may transmit control signaling to the DU authorizing the DU to transmit unscheduled load reports. In some examples, a DU may report measurements made associated with a communications load involving communications with both a parent network entity (e.g., a CU) and at least one child network entity (e.g., a user equipment (UE)). The load report may indicate an enhanced multiplexing mode which may include various transmit (TX) and receive (RX) modes pertaining to a mobile termination (MT) (e.g., communication with a UE) and communication with a CU through a DU functionality. Such enhanced multiplexing modes may include: 1) an MT TX and DU RX mode; 2) an MT TX and DU TX mode; 3) an MT RX and DU RX mode; or 4) an MT RX and DU TX mode.

A method for wireless communications at a network entity is described. The method may include receiving, from a first CU and via a backhaul communications link, a control message including an indication of one or more triggering conditions for reporting of a load report from the network entity to the first CU, the one or more triggering conditions including at least upper or lower parameter thresholds, the network entity being one of a DU or a second CU, measuring at least one parameter associated with a communications load at the network entity, and transmitting, to the first CU and via the backhaul communications link, based on the at least one measured parameter satisfying at least one of the upper or lower parameter thresholds of the one or more triggering conditions, the load report including the at least one measured parameter.

An apparatus for wireless communications at a network entity is described. The apparatus may include a processor, memory coupled with the processor, and instructions stored in the memory. The instructions may be executable by the processor to cause the apparatus to receive, from a first CU and via a backhaul communications link, a control message including an indication of one or more triggering conditions for reporting of a load report from the network entity to the first CU, the one or more triggering conditions including at least upper or lower parameter thresholds, the network entity being one of a DU or a second CU, measure at least one parameter associated with a communications load at the network entity, and transmit, to the first CU and via the backhaul communications link, based on the at least one measured parameter satisfying at least one of the upper or lower parameter thresholds of the one or more triggering conditions, the load report including the at least one measured parameter.

Another apparatus for wireless communications at a network entity is described. The apparatus may include means for receiving, from a first CU and via a backhaul communications link, a control message including an indication of one or more triggering conditions for reporting of a load report from the network entity to the first CU, the one or more triggering conditions including at least upper or lower parameter thresholds, the network entity being one of a DU or a second CU, means for measuring at least one parameter associated with a communications load at the network entity, and means for transmitting, to the first CU and via the backhaul communications link, based on the at least one measured parameter satisfying at least one of the upper or lower parameter thresholds of the one or more triggering conditions, the load report including the at least one measured parameter.

A non-transitory computer-readable medium storing code for wireless communications at a network entity is described. The code may include instructions executable by a processor to receive, from a first CU and via a backhaul communications link, a control message including an indication of one or more triggering conditions for reporting of a load report from the network entity to the first CU, the one or more triggering conditions including at least upper or lower parameter thresholds, the network entity being one of a DU or a second CU, measure at least one parameter associated with a communications load at the network entity, and transmit, to the first CU and via the backhaul communications link, based on the at least one measured parameter satisfying at least one of the upper or lower parameter thresholds of the one or more triggering conditions, the load report including the at least one measured parameter.

Some examples of the method, apparatuses, and non-transitory computer-readable medium described herein may further include operations, features, means, or instructions for receiving the indication of the one or more triggering conditions on a per cell basis, a per network slice basis, a per synchronization signal block basis, a per traffic type basis, or a per communication direction basis.

In some examples of the method, apparatuses, and non-transitory computer-readable medium described herein, measuring the at least one parameter may include operations, features, means, or instructions for measuring at least one of a hardware load, a transport network layer capacity, a composite capacity, a network slice availability, a communication resource availability, a physical resource block usage, or a number of active child network nodes.

In some examples of the method, apparatuses, and non-transitory computer-readable medium described herein, measuring the at least one parameter may include operations, features, means, or instructions for measuring the at least one parameter associated with one of a transmission and reception point of the network entity, a radio unit (RU) of the network entity, a repeater of the network entity, or a reflective surface of the network entity, and where the load report indicates the associated one of the transmission and reception point of the network entity, the RU of the network entity, the repeater of the network entity, or the reflective surface of the network entity.

In some examples of the method, apparatuses, and non-transitory computer-readable medium described herein, the network entity many be an integrated access and backhaul (IAB) node and the method, apparatuses, and non-transitory computer-readable medium may include further operations, features, means, or instructions for receiving the indication of the one or more triggering conditions on a per access basis, a per backhaul basis, or a per access and backhaul basis.

In some examples of the method, apparatuses, and non-transitory computer-readable medium described herein, the network entity may be an IAB node and the method, apparatuses, and non-transitory computer-readable medium may include further operations, features, means, or instructions for transmitting, with the load report, first information indicative of first resources that may be available and second information indicative of second resources that may be conditionally available.

Some examples of the method, apparatuses, and non-transitory computer-readable medium described herein may further include operations, features, means, or instructions for receiving the indication of the one or more triggering conditions on a per bandwidth part basis, a per resource block basis, or a per resource block group basis.

In some examples of the method, apparatuses, and non-transitory computer-readable medium described herein, measuring the at least one parameter may include operations, features, means, or instructions for measuring the at least one parameter associated with the communications load associated with communications with a parent network entity and at least one child network entity in an operations mode including one of a set of enhanced multiplexing modes or a time division duplexing (TDD) mode, and where the load report indicates the operations mode.

A method for wireless communications a network entity is described. The method may include communicating, between the network entity and a first CU, an indication that autonomous initiation of a load report by the network entity is supported, the communicating being via a backhaul communications link between the network entity and the first CU, the network entity being one of a DU or a second CU, measuring at least one parameter associated with a communications load at the network entity, generating, in an absence of a request by the first CU and in accordance with the indication, a multi-bit load report based on the at least one measured parameter, and transmitting, to the first CU and via the backhaul communications link, the multi-bit load report.

An apparatus for wireless communications a network entity is described. The apparatus may include a processor, memory coupled with the processor, and instructions stored in the memory. The instructions may be executable by the processor to cause the apparatus to communicate, between the network entity and a first CU, an indication that autonomous initiation of a load report by the network entity is supported, the communicating being via a backhaul communications link between the network entity and the first CU, the network entity being one of a DU or a second CU, measure at least one parameter associated with a communications load at the network entity, generate, in an absence of a request by the first CU and in accordance with the indication, a multi-bit load report based on the at least one measured parameter, and transmit, to the first CU and via the backhaul communications link, the multi-bit load report.

Another apparatus for wireless communications a network entity is described. The apparatus may include means for communicating, between the network entity and a first CU, an indication that autonomous initiation of a load report by the network entity is supported, the communicating being via a backhaul communications link between the network entity and the first CU, the network entity being one of a DU or a second CU, means for measuring at least one parameter associated with a communications load at the network entity, means for generating, in an absence of a request by the first CU and in accordance with the indication, a multi-bit load report based on the at least one measured parameter, and means for transmitting, to the first CU and via the backhaul communications link, the multi-bit load report.

A non-transitory computer-readable medium storing code for wireless communications a network entity is described. The code may include instructions executable by a processor to communicate, between the network entity and a first CU, an indication that autonomous initiation of a load report by the network entity is supported, the communicating being via a backhaul communications link between the network entity and the first CU, the network entity being one of a DU or a second CU, measure at least one parameter associated with a communications load at the network entity, generate, in an absence of a request by the first CU and in accordance with the indication, a multi-bit load report based on the at least one measured parameter, and transmit, to the first CU and via the backhaul communications link, the multi-bit load report.

In some examples of the method, apparatuses, and non-transitory computer-readable medium described herein, communicating the indication that autonomous initiation of the load report by the network entity may be supported may include operations, features, means, or instructions for receiving, from the first CU, a control message authorizing the network entity to initiate multi-bit load reports.

In some examples of the method, apparatuses, and non-transitory computer-readable medium described herein, communicating the indication that autonomous initiation of the load report by the network entity may be supported may include operations, features, means, or instructions for transmitting, to the first CU, a capability message indicating a capability of the network entity to autonomously initiate transmission of multi-bit load reports.

In some examples of the method, apparatuses, and non-transitory computer-readable medium described herein, communicating the indication that autonomous initiation of the load report by the network entity may be supported may include operations, features, means, or instructions for receiving, from the first CU, a capability message indicating a capability of the first CU to receive multi-bit load reports autonomously initiated by the network entity.

Some examples of the method, apparatuses, and non-transitory computer-readable medium described herein may further include operations, features, means, or instructions for generating the multi-bit load report on a per cell basis, a per network slice basis, a per synchronization signal block basis, a per traffic type basis, or a per communication direction basis.

In some examples of the method, apparatuses, and non-transitory computer-readable medium described herein, measuring the at least one parameter may include operations, features, means, or instructions for measuring at least one of a hardware load, a transport network layer capacity, a composite capacity, a network slice availability, a communication resource availability, a physical resource block usage, or a number of active child network nodes.

In some examples of the method, apparatuses, and non-transitory computer-readable medium described herein, measuring the at least one parameter may include operations, features, means, or instructions for measuring the at least one parameter associated with one of a transmission and reception point of the network entity, a RU of the network entity, a repeater of the network entity, or a reflective surface of the network entity, and where the multi-bit load report indicates the associated one of the transmission and reception point of the network entity, the RU of the network entity, the repeater of the network entity, or the reflective surface of the network entity.

In some examples of the method, apparatuses, and non-transitory computer-readable medium described herein, the network entity may be an IAB node and the method, apparatuses, and non-transitory computer-readable medium may include further operations, features, means, or instructions for transmitting, with the multi-bit load report, first information indicative of first resources that may be available and second information indicative of second resources that may be conditionally available.

Some examples of the method, apparatuses, and non-transitory computer-readable medium described herein may further include operations, features, means, or instructions for generating the multi-bit load report on a per bandwidth part basis, a per resource block basis, or a per resource block group basis.

In some examples of the method, apparatuses, and non-transitory computer-readable medium described herein, measuring the at least one parameter may include operations, features, means, or instructions for measuring the at least one parameter associated with the communications load associated with communications with a parent network entity and at least one child network entity in an operations mode including one of a set of enhanced multiplexing modes or a TDD mode, and where the multi-bit load report indicates the operations mode.

A method for wireless communications a network entity is described. The method may include receiving, from a first CU and via a backhaul communications link, a control message that indicates a load report configuration, where the load report configuration includes that the network entity is to report one or more multiplexing modes applied by the network entity to communications between the network entity and one or more parent network entities or one or more child network entities, the network entity being one of a DU or a second CU, measuring at least one parameter associated with a communications load associated with the communications, generating a load report to include an indication of the at least one parameter and at least one multiplexing mode applied by the network entity, the at least one multiplexing mode being in addition to a baseline TDD mode, and transmitting, to the first CU and via the backhaul communications link, the load report indicating the at least one measured parameter and the at least one multiplexing mode.

An apparatus for wireless communications a network entity is described. The apparatus may include a processor, memory coupled with the processor, and instructions stored in the memory. The instructions may be executable by the processor to cause the apparatus to receive, from a first CU and via a backhaul communications link, a control message that indicates a load report configuration, where the load report configuration includes that the network entity is to report one or more multiplexing modes applied by the network entity to communications between the network entity and one or more parent network entities or one or more child network entities, the network entity being one of a DU or a second CU, measure at least one parameter associated with a communications load associated with the communications, generate a load report to include an indication of the at least one parameter and at least one multiplexing mode applied by the network entity, the at least one multiplexing mode being in addition to a baseline TDD mode, and transmit, to the first CU and via the backhaul communications link, the load report indicating the at least one measured parameter and the at least one multiplexing mode.

Another apparatus for wireless communications a network entity is described. The apparatus may include means for receiving, from a first CU and via a backhaul communications link, a control message that indicates a load report configuration, where the load report configuration includes that the network entity is to report one or more multiplexing modes applied by the network entity to communications between the network entity and one or more parent network entities or one or more child network entities, the network entity being one of a DU or a second CU, means for measuring at least one parameter associated with a communications load associated with the communications, means for generating a load report to include an indication of the at least one parameter and at least one multiplexing mode applied by the network entity, the at least one multiplexing mode being in addition to a baseline TDD mode, and means for transmitting, to the first CU and via the backhaul communications link, the load report indicating the at least one measured parameter and the at least one multiplexing mode.

A non-transitory computer-readable medium storing code for wireless communications a network entity is described. The code may include instructions executable by a processor to receive, from a first CU and via a backhaul communications link, a control message that indicates a load report configuration, where the load report configuration includes that the network entity is to report one or more multiplexing modes applied by the network entity to communications between the network entity and one or more parent network entities or one or more child network entities, the network entity being one of a DU or a second CU, measure at least one parameter associated with a communications load associated with the communications, generate a load report to include an indication of the at least one parameter and at least one multiplexing mode applied by the network entity, the at least one multiplexing mode being in addition to a baseline TDD mode, and transmit, to the first CU and via the backhaul communications link, the load report indicating the at least one measured parameter and the at least one multiplexing mode.

In some examples of the method, apparatuses, and non-transitory computer-readable medium described herein, receiving the control message may include operations, features, means, or instructions for receiving information indicative of one or more triggering conditions, where generating the load report may be based on the at least one measured parameter satisfying at least one of the one or more triggering conditions.

Some examples of the method, apparatuses, and non-transitory computer-readable medium described herein may further include operations, features, means, or instructions for receiving the information indicative of the one or more triggering conditions on a per cell basis, a per network slice basis, a per synchronization signal block basis, a per traffic type basis, or a per communication direction basis.

In some examples of the method, apparatuses, and non-transitory computer-readable medium described herein, the network entity may be an IAB node and the method, apparatuses, and non-transitory computer-readable medium may include further operations, features, means, or instructions for receiving the information indicative of the one or more triggering conditions on a per access basis, a per backhaul basis, or a per access and backhaul basis.

Some examples of the method, apparatuses, and non-transitory computer-readable medium described herein may further include operations, features, means, or instructions for receiving the information indicative of the one or more triggering conditions on a per bandwidth part basis, a per resource block basis, or a per resource block group basis.

In some examples of the method, apparatuses, and non-transitory computer-readable medium described herein, measuring the at least one parameter may include operations, features, means, or instructions for measuring at least one of a hardware load, a transport network layer capacity, a composite capacity, a network slice availability, a communication resource availability, a physical resource block usage, or a number of active child network nodes.

In some examples of the method, apparatuses, and non-transitory computer-readable medium described herein, measuring the at least one parameter may include operations, features, means, or instructions for measuring the at least one parameter associated with one of a transmission and reception point of the network entity, a RU of the network entity, a repeater of the network entity, or a reflective surface of the network entity, and where the load report indicates the associated one of the transmission and reception point of the network entity, the RU of the network entity, the repeater of the network entity, or the reflective surface of the network entity.

In some examples of the method, apparatuses, and non-transitory computer-readable medium described herein, the network entity may be an IAB node and the method, apparatuses, and non-transitory computer-readable medium may include further operations, features, means, or instructions for transmitting, with the load report, first information indicative of first resources that may be available and second information indicative of second resources that may be conditionally available.

In some examples of the method, apparatuses, and non-transitory computer-readable medium described herein, measuring the at least one parameter may include operations, features, means, or instructions for measuring the at least one parameter associated with the communications load associated with communications with a parent network entity and at least one child network entity in an operations mode including one of a set of enhanced multiplexing modes or a TDD mode, and where the load report indicates the operations mode.

DETAILED DESCRIPTION

Figure 1:
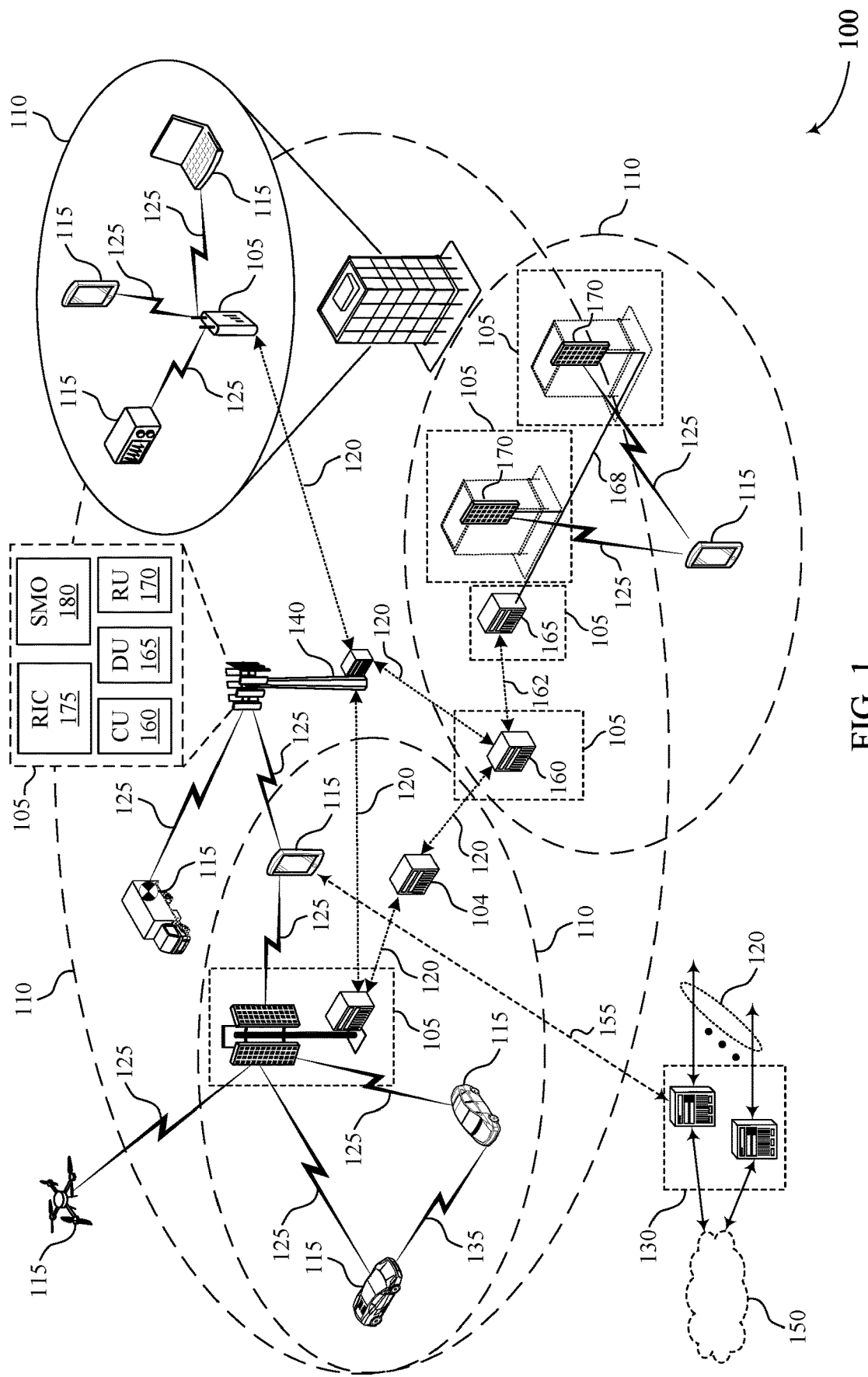
FIG. 1 illustrates an example of a wireless communications system that supports load reporting in backhaul communications in accordance with one or more aspects of the present disclosure.

In wireless communications systems, network entities such as a centralized unit (CU) or a distributed unit (DU) may communicate with each other or with other network entities via backhaul communications. For example, a CU may communicate with another CU via an Xn interface and a CU may communicate with a DU via an F1 interface. A CU may request reporting of load measurements from a DU or another CU. The request may include report characteristics (e.g., which parameters to report), a granularity (e.g., a cell, synchronization signal block (SSB) area, or slice), and a report periodicity. Example parameters include a hardware load capacity of the reporting DU or CU. Further, some DUs may be configured to transmit a one-bit indication to a CU indicating whether the DU is overloaded. DUs may not be configured to initiate more detailed load status reports, however, and DUs and CUs may not be configured to initiate status reports based on triggering conditions. Instead, DUs and CUs may be configured to periodically transmit reports, which may result in high energy consumption and inefficient use of communication resources.

Aspects of the disclosure relate to enhanced load reporting between network entities (e.g., load reporting provided by a DU to a CU or by a CU to another CU). In some examples, the CU may provide one or more triggering events which may be used by the DU (or a second CU) to trigger the provisioning of a load report to the CU. By providing the triggering events to the DU (or second CU), the DU (or second CU) may be able to initiate a load report without relying on periodic reporting criteria. In some examples, the DU (or a second CU) may initiate a load report to the CU without being configured with triggering events. For example, the DU (or a second CU) may determine criteria for autonomously reporting a load report. In some examples, the DU may indicate, to the CU, the capability of the DU to initiate load reports, and the CU may transmit control signaling to the DU authorizing the DU to transmit unscheduled load reports. In some examples, a DU may report measurements made associated with a communications load involving communications with both a parent network entity (e.g., a CU) and at least one child network entity (e.g., a user equipment (UE)). The load report may indicate an enhanced multiplexing mode which may include various transmit (TX) and receive (RX) modes pertaining to a mobile termination (MT) (e.g., communication with a UE) and communication with a CU through a DU functionality. Such enhanced multiplexing modes may include: 1) an MT TX and DU RX mode; 2) an MT TX and DU TX mode; 3) an MT RX and DU RX mode; or 4) an MT RX and DU TX mode.

Aspects of the disclosure are initially described in the context of wireless communications systems. Aspects of the disclosure are further illustrated by and described with reference to process flows. Aspects of the disclosure are further illustrated by and described with reference to apparatus diagrams, system diagrams, and flowcharts that relate to load reporting in backhaul communications.

FIG. 1 illustrates an example of a wireless communications system 100 that supports load reporting in backhaul communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communications links 125 (e.g., a radio frequency (RF) access link). For example, a network entity 105 may support a coverage area 110 (e.g., a geographic coverage area) over which the UEs 115 and the network entity 105 may establish one or more communications links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communications links 120 (e.g., in accordance with an S1, N2, N3, or other interface protocol). In some examples, network entities 105 may communicate with one another over a backhaul communications link 120 (e.g., in accordance with an X2, Xn, or other interface protocol) either directly (e.g., directly between network entities 105) or indirectly (e.g., via a core network 130). In some examples, network entities 105 may communicate with one another via a midhaul communications link 162 (e.g., in accordance with a midhaul interface protocol) or a fronthaul communications link 168 (e.g., in accordance with a fronthaul interface protocol), or any combination thereof. The backhaul communications links 120, midhaul communications links 162, or fronthaul communications links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communications link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a CU 160, a DU 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communications link 162 (e.g., F1, F1-c, F1-u), and a DU 165 may be connected to one or more RUs 170 via a fronthaul communications link 168 (e.g., open fronthaul (FH) interface). In some examples, a midhaul communications link 162 or a fronthaul communications link 168 may be implemented in accordance with an interface (e.g., a channel) between layers of a protocol stack supported by respective network entities 105 that are in communication over such communications links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communications links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communications links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104.

That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communications link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communications link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support load reporting in backhaul communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communications links 125 (e.g., an access link) over one or more carriers. The term "carrier" may refer to a set of RF spectrum resources having a defined physical layer structure for supporting the communications links 125. For example, a carrier used for a communications link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communications links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta F_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communications link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communications link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz).

Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communications link (e.g., a communications link 125, a D2D communications link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

The wireless communications system may support enhanced load reporting between network entities 105 (e.g., between components of a network entity 105 (e.g., load reporting provided by a DU 165 to a CU 160 or a CU 160 to another CU). In some examples, the CU may provide one or more triggering events which may be used by the DU 165 (or a second CU 160) to trigger the provisioning of a load report to the CU 160. By providing the triggering events to the DU 165 (or second CU 160), the DU 165 (or second CU 160) may be able to initiate a load report without relying on periodic reporting criteria. In some examples, the DU 165 may initiate a load report to the CU 160 without being configured with triggering events. For example, the DU 165 may determine criteria for autonomously reporting a load report. In some examples, the DU 165 may indicate, to the CU 160, the capability of the DU 165 to initiate load reports, and the CU 160 may transmit control signaling to the DU 165 authorizing the DU 165 to transmit unscheduled load reports. In some examples, a DU 165 may report measurements made associated with a communications load involving communications with both a parent network entity (e.g., a CU 160) and at least one child network entity (e.g., a UE). The load report may indicate an enhanced multiplexing mode which may include various TX and RX modes pertaining to a MT (e.g., communication with a UE) and communication with a CU 160 through a DU 165 functionality. Such enhanced multiplexing modes may include: 1) an MT TX and DU 165 RX mode; 2) an MT TX and DU 165 TX mode; 3) an MT RX and DU 165 RX mode; or 4) an MT RX and DU 165 TX mode.

Figure 2:
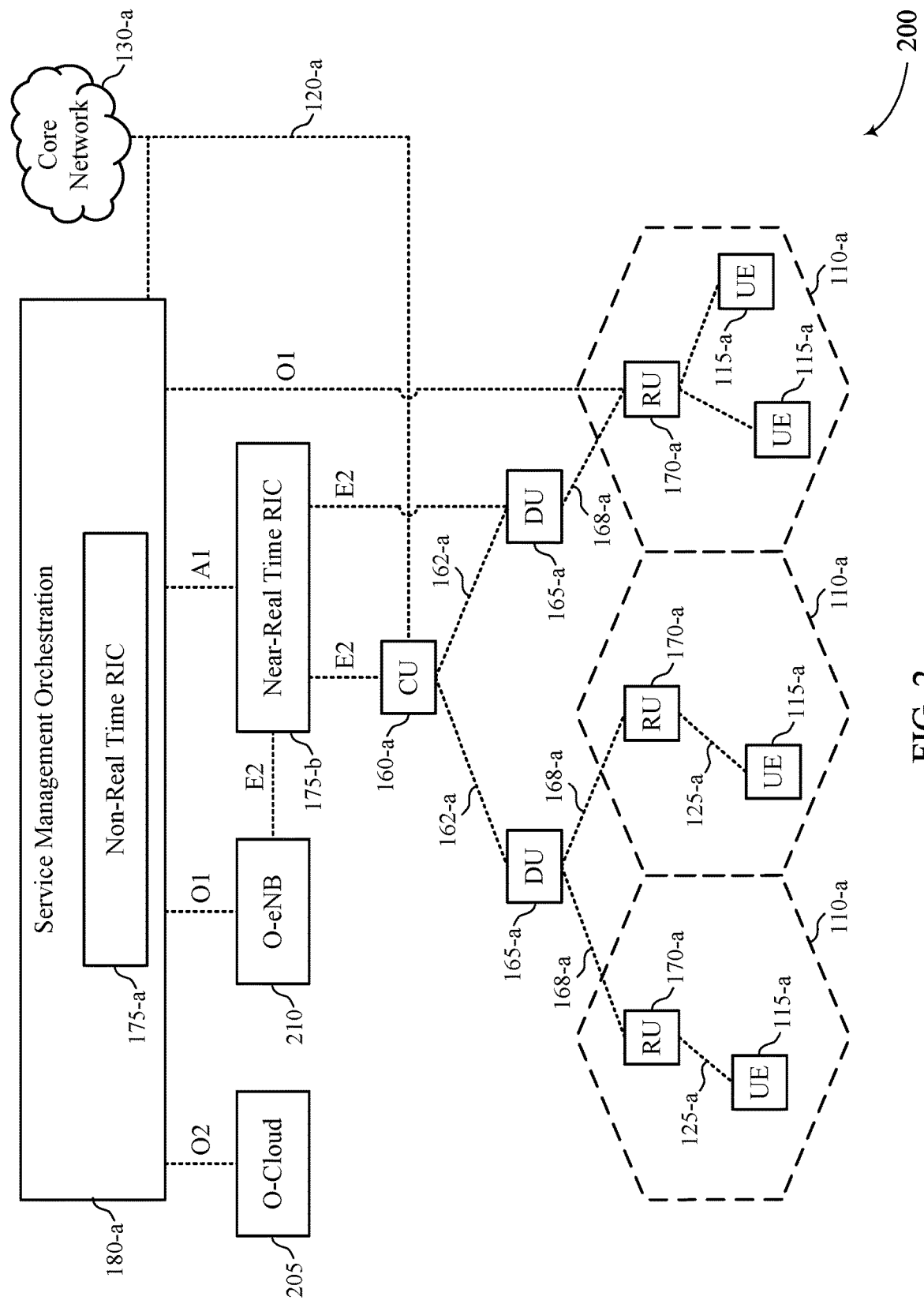
FIG. 2 illustrates an example of a wireless communications system that supports load reporting in backhaul communications in accordance with one or more aspects of the present disclosure.

FIG. 2 illustrates an example of a network architecture 200 that (e.g., a disaggregated base station architecture, a disaggregated RAN architecture) that supports load reporting in backhaul communications in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communications link 120-*a*, or indirectly with the core network 130-*a* through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communications links 162-a (e.g., an F1 interface). The DUs 165-a may communicate with one or more RUs 170-a via respective fronthaul communications links 168-a. The RUs 170-a may be associated with respective coverage areas 110-a and may communicate with UEs 115-a via one or more communications links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (e.g., CU-UP), control plane functionality (e.g., CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a, as necessary, for network control and signaling.

A DU 165-a may correspond to a logical unit that includes one or more functions (e.g., base station functions, RAN functions) to control the operation of one or more RUs 170-a. In some examples, a DU 165-a may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-a may further host one or more low PHY layers. Each layer may be implemented with an interface configured to communicate signals with other layers hosted by the DU 165-a, or with control functions hosted by a CU 160-a.

In some examples, lower-layer functionality may be implemented by one or more RUs 170-a. For example, an RU 170-a, controlled by a DU 165-a, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some examples, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtualized network entities 105. For non-virtualized network entities 105, the SMO 180-a may be configured to support the deployment of dedicated physical resources for RAN coverage requirements which may be managed via an operations and maintenance interface (e.g., an O1 interface). For virtualized network entities 105, the SMO 180-a may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-a, DUs 165-a, RUs 170-a, and Near-RT RICs 175-b. In some implementations, the SMO 180-a may communicate with components configured in accordance with a 4G RAN (e.g., via an O1 interface). Additionally, or alternatively, in some implementations, the SMO 180-a may communicate directly with one or more RUs 170-a via an O1 interface. The SMO 180-a also may include a Non-RT RIC 175-a configured to support functionality of the SMO 180-a.

The Non-RT RIC 175-a may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-b. The Non-RT RIC 175-a may be coupled to or communicate with (e.g., via an A1 interface) the Near-RT RIC 175-b. The Near-RT RIC 175-b may be configured to include a logical function that enables near-real-time control and optimization of RAN elements and resources via data collection and actions over an interface (e.g., via an E2 interface) connecting one or more CUs 160-a, one or more DUs 165-a, or both, as well as an O-eNB 210, with the Near-RT RIC 175-b.

In some examples, to generate AI/ML models to be deployed in the Near-RT RIC 175-b, the Non-RT RIC 175-a may receive parameters or external enrichment information from external servers. Such information may be utilized by the Near-RT RIC 175-b and may be received at the SMO 180-a or the Non-RT RIC 175-a from non-network data sources or from network functions. In some examples, the Non-RT RIC 175-a or the Near-RT RIC 175-b may be configured to tune RAN behavior or performance. For example, the Non-RT RIC 175-a may monitor long-term trends and patterns for performance and employ AI or ML models to perform corrective actions through the SMO 180-a (e.g., reconfiguration via O1) or via generation of RAN management policies (e.g., A1 policies).

Figure 3:
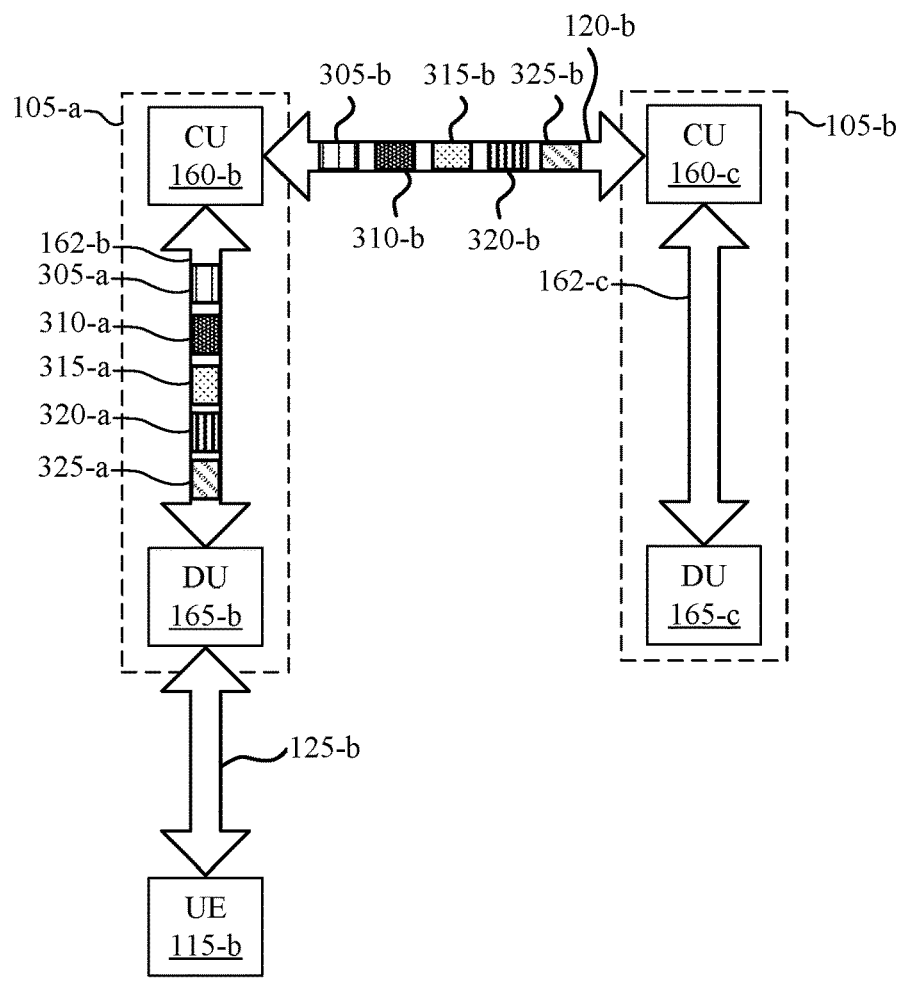
FIG. 3 illustrates an example of a wireless communications system that supports load reporting in backhaul communications in accordance with one or more aspects of the present disclosure.

FIG. 3 illustrates an example of a wireless communications system 300 that supports load reporting in backhaul communications in accordance with one or more aspects of the present disclosure. In some examples, the wireless communications system 300 may implement aspects of wireless communications system 100 or the network architecture 200. The wireless communications system 300 may include a UE 115-*b*, which may be an example of a UE 115 as described herein. The wireless communications system 300 may include a network entity 105-*a* and a network entity 105-*b*, which may be examples of a network entity 105 as described herein. The wireless communications system 300 may include a CU 160-*b* and a CU 160-*c*, which may be examples of a CU 160 as described herein. The wireless communications system 300 may include a DU 165-*b* and a DU 165-*c*, which may be examples of a DU 165 as described herein.

The UE 115-*b* may communicate with the DU 165-*b* using a communications link 125-*b*, which may be examples of NR or LTE links between the UE 115-*b* and the DU 165-*b*. The communications link 125-*b* may include bi-directional links that enable both uplink and downlink communication. For example, the UE 115-*b* may transmit uplink signals, such as uplink control signals or uplink data signals, to the DU 165-*b* using the communications link 125-*b* and the DU 165-*b* may transmit downlink transmissions, such as downlink control signals or downlink data signals, to the UE 115-*b* using the communications link 125-*b*.

The CU 160-*b* may communicate with the DU 165-*b* via a midhaul communications link 162-*b*. In some examples, the midhaul communications link 162-*b* may be an example of an F1 interface. The CU 160-*c* may communicate with the DU 165-*c* via a midhaul communications link 162-*c*. In some examples, the midhaul communications link 162-*c* may be an example of an F1 interface.

The CU 160-*b* may communicate with the CU 160-*c* via a backhaul communications link 120-*b*. In some examples, the backhaul communications link 120-*b* may be an Xn interface.

A network entity such as the CU 160-*b* may transmit a load measurement request 305-*a* for a report of load measurements from a connected DU 165-*b* (e.g., via the midhaul communications link 162-*b*) or a load measurement request 305-*b* for a report of load measurements from another CU 160-*c* (e.g., via the backhaul communications link 120-*b*). A load measurement request may include report characteristics, a report granularity (e.g., per cell, per SSB area, or per slice), or a report periodicity. In response to a load measurement request 305-*a*, the DU 165-*b* may transmit a load report 320-*a* via the midhaul communications link 162-*b*. In response to a load measurement request 305-*a*, the CU 160-*b* may transmit a load report 320-*b* via the backhaul communications link 120-*a*.

In some examples, load measurements may include a hardware load indicator from the DU 165-*b* (e.g., an indication of a load percentage for uplink traffic or downlink traffic). In some examples, a load report 320 may include a transport network layer (TNL) capacity indicator (e.g., an offered (in maximum kilobytes per second) and available percent capacity of the transport portion serving the cell in downlink or uplink). In some examples, a load report 320 may include a composite available capacity group. For example, the composite available capacity group may include an available resource level per cell or SSB area for downlink or uplink (e.g., for resources configured to uplink or downlink traffic purposes). In some examples, the composite available capacity group may indicate a cell capacity class value relative to other cells (e.g., linearly between 1 and 100). In some examples, the composite available capacity group may indicate a capacity value relative to total DU 165-*b* resources (e.g., indicated via a linear percentage). In some examples, a load report 320 may include a slice available capacity percentage (e.g., a percentage of available slice resource to total cell resources in downlink or uplink). In some examples, a slice available capacity percentage may be weighted according to cell capacity class value if available. In some examples, a load report 320-*b* from the CU 160-*c* may include a number of current RRC connections. In some examples, a load report 320-*b* from the CU 160-*c* may include a maximum number of supported UEs 115 connected in an RRC connected mode plus a residual percentage per cell. In some examples, a load report 320 may indicate a radio resource status. For example, a load report 320 may indicate a usage of physical resource blocks (PRBs) per cell and SSB area for all traffic for the CU 160-*c* or DU 165-*b* in downlink or uplink and/or usage of physical downlink control channel (PDCCH) control channel elements (CCEs) for uplink or downlink scheduling. In some examples, a load report 320 may indicate a number of active UEs 115. For example, a load report 320 may indicate a mean number of UEs 115 for which there is data available for transmission (whether available for uplink, downlink, or both). In some cases, the DU 165-*b* may transmit a load report 320-*a* indicating whether or not the DU 165-*b* is overloaded (e.g., a single bit load report). In some cases, the DU 165-*b* may autonomously transmit a single bit load report indicating whether the DU 165-*b* is overloaded (e.g., the DU 165-*b* may transmit a single bit load report without a request for a load report from the CU 160-*b*). In some cases, the DU 165-*b* may transmit a load report 320-*a* indicating a congestion indication per child link or per backhaul radio link control (RLC) identifier.

In some examples, the CU 160-*c* or the DU 165-*b* may transmit load reports 320 based on triggering events or measurements. For example, the CU 160-*c* may transmit a control message 310-*a* to the DU 165-*b* or a control message 310-*b* to the CU 160-*c* including an indication of one or more triggering conditions for reporting of a load report 320. Example triggering conditions may include parameters described herein (e.g., hardware load, TNL capacity, composite capacity, slice available capacity, available resources, PRB usage, usage of PDCCH CCEs for downlink or uplink, a number of active child nodes). The triggering condition may be a described parameter passing an upper or lower parameter threshold, which may be configured in the control message 310. The upper or lower parameter threshold may be defined per any parameter. The parameters and/or thresholds may be configured on a per cell basis, a per SSB area basis, a per traffic type (e.g., for guaranteed bit rate (GBR) or non-GBR, for delay critical or non-delay critical), or per direction (e.g., for uplink or downlink). The DU 165-*b* or the CU 160-*c* may measure the indicated parameter, and transmit a report 320 to the CU 160-*b* based on the measured parameter satisfying the triggering condition. Event triggered load reports (e.g., as opposed to periodic load reports) may reduce backhaul signaling and therefore lead to less backhaul energy consumption, especially for wireless backhaul where load reports may be sent over the air and possibly across multiple hops (e.g., in the case that a DU 165 or CU 160 is an IAB node).

In some cases, the DU 165-*b* or the CU 160-*c* may autonomously initiate a multi-bit load report 325. For example, the DU 165-*b* may autonomously generate and transmit a multi-bit load report 325-*a* and the CU 160-*c* autonomously generate and transmit a multi-bit load report 325-*b*. For example, the CU 160-*b* may communicate an indication 315-*a* with the DU 165-*b* or an indication 315-*b* with the CU 160-*c* that autonomous initiation of a load report by the respective DU 165-*b* or CU 160-*c* is supported. The DU 165-*b* or the CU 160-*c* may measure a parameter associated with a communications load at the DU 165-*b* or the CU 160-*c* as described herein, and generate, in the absence of a request from the CU 160-*b*, a multi-bit load report based on the measured parameter. The DU 165-*b* or the CU 160-*c* may transmit the generated multi-bit load report 325. In some examples, the multi-bit load report 325 may be an overload report (e.g., indicating whether the DU 165-*b* or the CU 160-*c* is overloaded) on a on a per cell basis, a per SSB area basis, a per traffic type (e.g., for GBR or non-GBR, for delay critical or non-delay critical), or per direction (e.g., for uplink or downlink). In some examples, the multi-bit load report 325 may include any parameters as described herein. In some examples, the multi-bit load report 325 may include a bit string to indicate different overload indications (e.g., where each indication may be associated with a different granularity such as per cell, per SSB area, a per traffic type, or per direction, associated with a different measured parameter.

In some cases, communicating the indication 315-*a* or the indication 315-*b* may include coordination between the CU 160-*b* and the DU 165-*b* or the CU 160-*c*. For example, the DU 165-*b* or the CU 160-*c* may indicate to the CU 160-*b* whether the DU 165-*b* or the CU 160-*c* supports transmission of an autonomous load report. In some cases, the indication may be sent via an operations, administration, and maintenance (OAM) node). In some cases, the CU 160-*b* may transmit an authorization message to the DU 165-*b* or the CU 160-*c* authorizing the DU 165-*b* or the CU 160-*c* to transmit autonomous multi-bit load reports to the DU 165-*b*. The parameters in the multi-bit load report 325 and the format of the multi-bit load report may be negotiated in an F1-step, a network entity 105 configuration update, a network entity-CU configuration update, or a class-1 message. The negotiation may be such that the DU 165-*b*, the CU 160-*b*, or the CU 160-*c* indicates the parameters and/or reporting configuration, and the other network entity (e.g., the DU 165-*b*, the CU 160-*b*, or the CU 160-*c* responds by sending an acknowledgment for the configured indicated parameter or reporting configuration.

In some examples, load reports 320 or multi-bit load reports 325 may be configured at the granularity of transmission and reception points (TRPs), RUs, repeaters, or reconfigurable intelligent surfaces (RISs). In some cases, TRP information exchange between the CU 160-*b* and the DU 165-*b* or the CU 160-*c* may exist in the context of positioning. Smart repeaters (or lower-layer assisting nodes such as RISs) may integrate into a cell as UEs and begin serving UEs (e.g., forwarding Uu signals). The CU 160-*c* or the DU 165-*b* may be aware or the TRPs, repeaters, or RISs per cell and generate and transmit a load report 320 or a multi-bit load reports 325 based on the TRPs, repeaters, or RISs per cell.

In some examples, load reports 320 or multi-bit load reports 325 may report frequency domain resources (e.g., BWPs, resource block sets, resource block set groups of a cell).

In some cases, the DU 165-*b* or the CU 160-*c* may be an IAB node. Accordingly, a load report 320 or a multi-bit load report 325 may report parameters per access, per backhaul or total (e.g., access plus backhaul). For example, available resource levels may be reported per access, per backhaul, and total. As another example, PRB usage for GBR access traffic, PRB usage for GBR backhaul traffic, and PRB usage for GBR total traffic may be included in a load report 320 or a multi-bit load report 325. As another example, a number of active child UEs 115 for a IAB node or a number of active child IAB nodes for a parent IAB node may be included in a load report 320 or a multi-bit load report 325. Upon receiving a load report from a IAB node, a network entity such as a CU 160-*b* may employ different resource optimization handover schemes and/or load reductions schemes between different IAB nodes.

If the DU 165-*b* or the CU 160-*c* is an IAB node, the load report 320 or a multi-bit load report 325 may report hard versus soft resources. The hard and soft resources may be indicated for time domain resources or frequency domain resources for different resource block sets. In access networks, all cell resources may be available for the cell. In an IAB node, a cell resource may be available (hard), not available (NA), or conditionally available. Accordingly, for example, the DU 165-*b* may report PRB usage in available resources and PRB usage in conditionally available resources in a load report 320-*a*, which may inform the CU 160-*b* whether the resource configuration of the DU 165-*b* is efficient or not (e.g., whether a child IAB-DU 165-*b* is making use of soft resources).

In some cases, a load report 320-*a* or a multi-bit load report 325-*a* may indicate an enhanced multiplexing mode which may include various TX and RX modes pertaining to a MT (e.g., communication with a UE 115) and communication with a CU 160-*b* through a DU 165-*b* functionality. Such enhanced multiplexing modes may include: 1) an MT TX and DU RX mode; 2) an MT TX and DU TX mode; 3) an MT RX and DU RX mode; or 4) an MT RX and DU TX mode. A load report 320-*a* or a multi-bit load report 325-*a* may be per full-duplex, per half-duplex, or per total.

Figure 4:
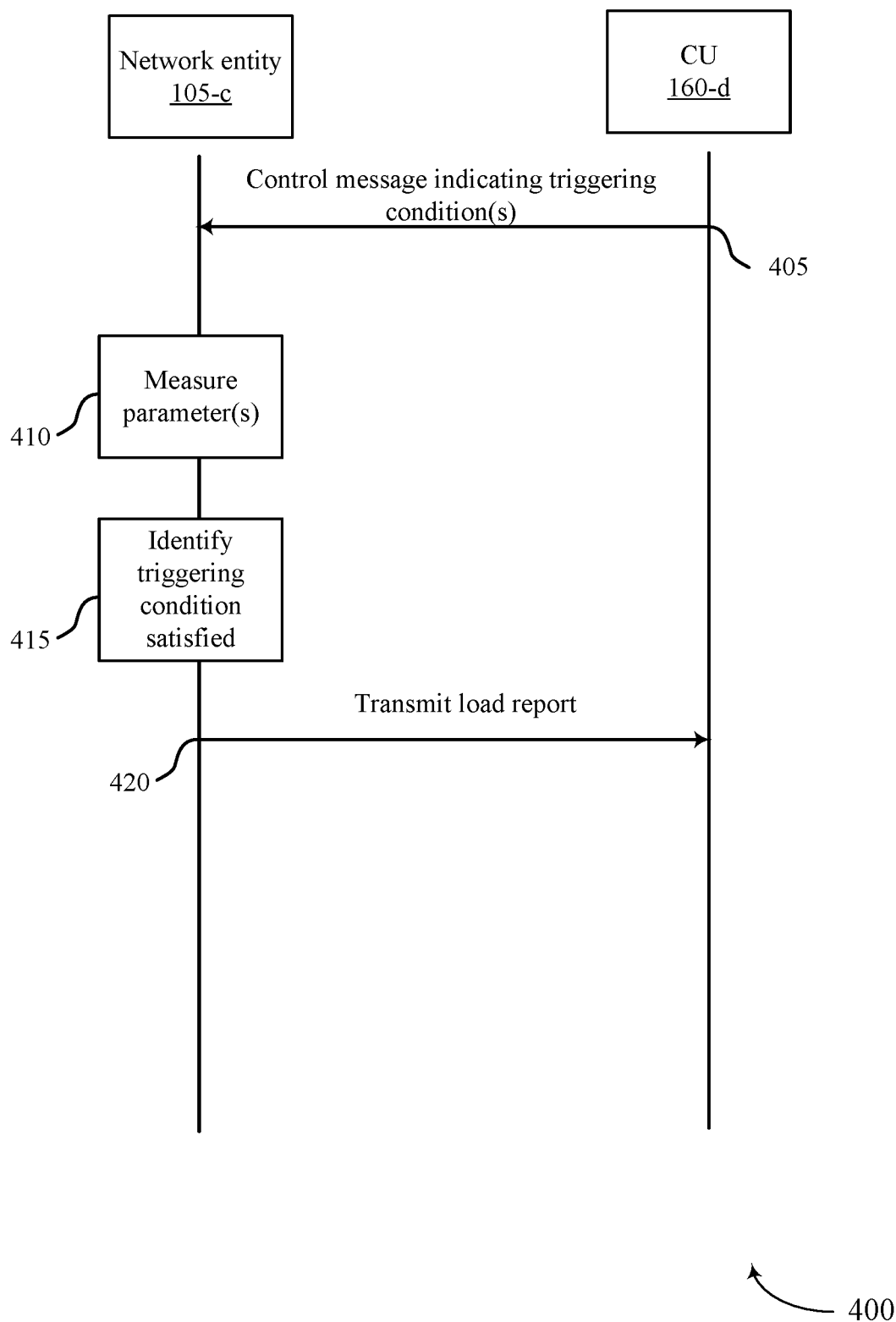
FIG. 4 illustrates an example of a process flow that supports load reporting in backhaul communications in accordance with one or more aspects of the present disclosure.

FIG. 4 illustrates an example of a process flow 400 that supports load reporting in backhaul communications in accordance with one or more aspects of the present disclosure. In some examples, the process flow 400 may implement aspects of wireless communications systems 100 or 300 or network architecture 200. The process flow 400 may include a network entity 105-*c*, which may be an example of a network entity 105 as described herein. For example, the network entity 105-*c* may be an example of a CU 160 as described herein or a DU 165 as described herein. The process flow may include a CU 160-*d*, which may be an example of a CU 160 as described herein. In the following description of the process flow 400, the operations between the network entity 105-*c* and the CU 160-*d* may be transmitted in a different order than the example order shown, or the operations performed by the network entity 105-*c* and the CU 160-*d* may be performed in different orders or at different times. Some operations may also be omitted from the process flow 400, and other operations may be added to the process flow 400.

At 405, the network entity 105-*c* may receive, from the CU 160-*d* via a backhaul communications link, a control message including an indication of one or more triggering conditions for reporting of a load report from the network entity 105-*c* to the CU 160-*d*, the one or more triggering conditions including at least upper or lower parameter thresholds.

At 410, the network entity 105-*c* may measure at least one parameter associated with a communications load at the network entity 105-*c*.

At 415, the network entity 105-*c* may identify that the measured parameter satisfies at least one of the upper or lower parameter thresholds of the one or more triggering conditions.

At 420, the network entity 105-*c* may transmit, to the CU 160-*d* via the backhaul communications link, based on the at least one measured parameter satisfying at least one of the upper or lower parameter thresholds of the one or more triggering conditions, the load report including the at least one measured parameter.

In some cases, at 405, the network entity 105-*c* may receive the indication of the one or more triggering conditions on a per cell basis, a per network slice basis, a per SSB basis, a per traffic type basis, or a per communication direction. In some cases, at 405, the network entity 105-*c* may receive the indication of the one or more triggering conditions on a per BWP basis, a per resource block basis, or a per resource block group basis.

In some cases, measuring the at least one parameter at 410 includes measuring at least one of a hardware load, a TNL capacity, a composite capacity, a network slice availability, a communication resource availability, a PRB usage, or a number of active child network nodes. In some cases, measuring the at least one parameter at 410 includes measuring the at least one parameter associated with one of a TRP of the network entity 105-*c*, an RU of the network entity 105-*c*, a repeater of the network entity 105-*c*, or a reflective surface of the network entity 105-*c*, and the load report indicates the associated TRP of the network entity 105-*c*, RU of the network entity 105-*c*, repeater of the network entity 105-*c*, or reflective surface of the network entity 105-*c*. In some cases, measuring the at least one parameter at 410 includes measuring the at least one parameter associated with the communications load associated with communications with a parent network entity and at least one child network entity in an operations mode including one of a set of enhanced multiplexing modes or a TDD mode, and the load report indicates the operations mode.

In some cases, the network entity 105-*c* may be an IAB node, and the network entity 105-*c* may receive the indication of the one or more triggering conditions at 405 on a per access basis, a per backhaul basis, or a per access and backhaul basis.

In some cases, the network entity 105-*c* may be an IAB node, and the network entity 105-*c* may transmit, with the load report at 420, first information indicative of first resources that are available and second information indicative of second resources that are conditionally available.

Figure 5:
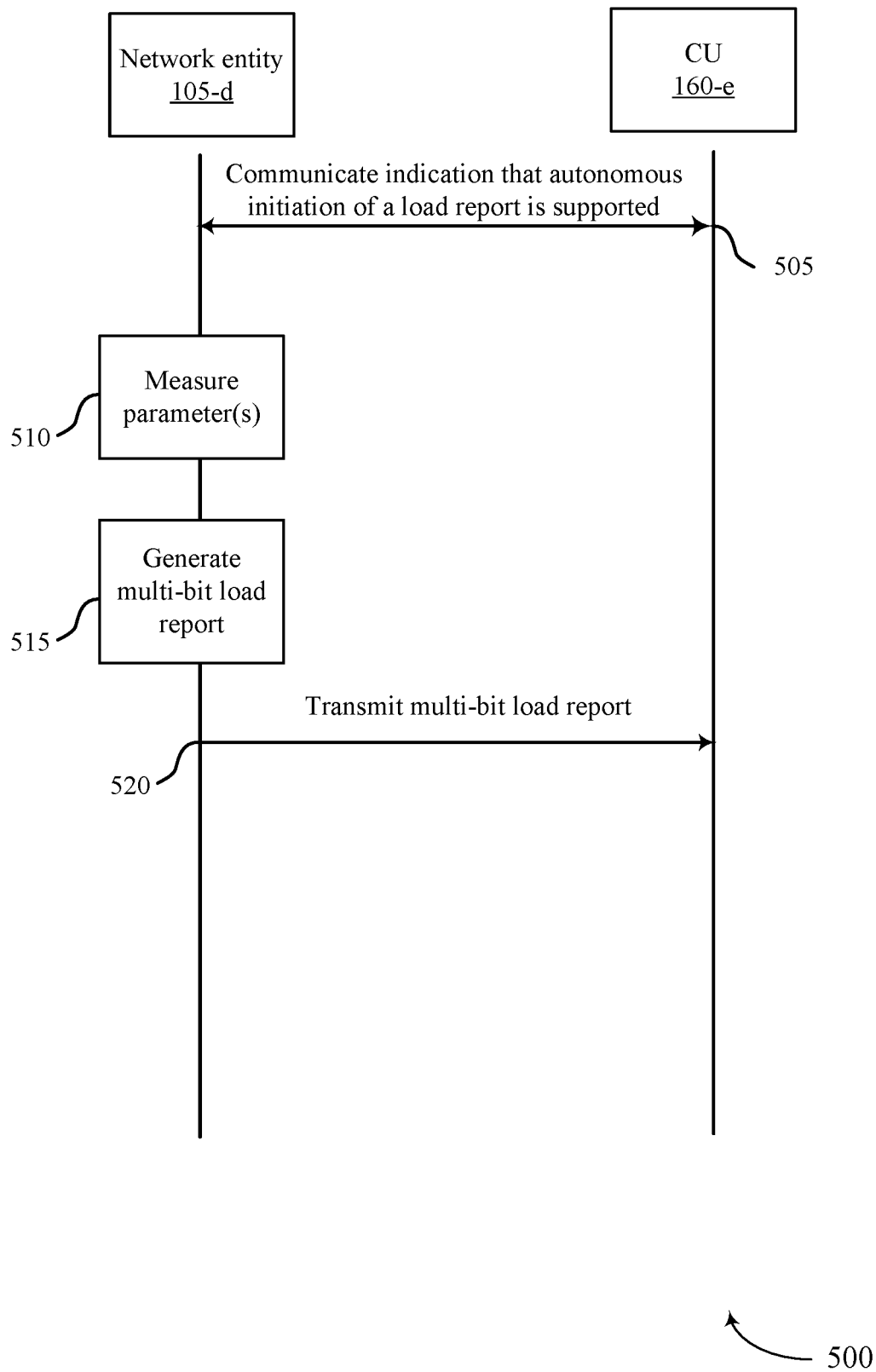
FIG. 5 illustrates an example of a process flow that supports load reporting in backhaul communications in accordance with one or more aspects of the present disclosure.

FIG. 5 illustrates an example of a process flow 500 that supports load reporting in backhaul communications in accordance with one or more aspects of the present disclosure. In some examples, the process flow 500 may implement aspects of wireless communications systems 100 or 300 or network architecture 200. The process flow 500 may include a network entity 105-*d*, which may be an example of a network entity 105 as described herein. For example, the network entity 105-*d* may be an example of a CU 160 as described herein or a DU 165 as described herein. The process flow may include a CU 160-*e*, which may be an example of a CU 160 as described herein. In the following description of the process flow 500, the operations between the network entity 105-*d* and the CU 160-*e* may be transmitted in a different order than the example order shown, or the operations performed by the network entity 105-*d* and the CU 160-*e* may be performed in different orders or at different times. Some operations may also be omitted from the process flow 500, and other operations may be added to the process flow 500.

At 505, the CU 160-*e* and the network entity 105-*d* may communicate, via a backhaul communications link, an indication that autonomous initiation of a load report by the network entity 105-*d* is supported. In some examples, communicating the indication that autonomous initiation of a load report by the network entity 105-*d* is supported may include receiving, at the network entity 105-*d* from the CU 160-*e*, a control message authorizing the network entity 105-*d* to initiate multi-bit load reports. In some examples, communicating the indication that autonomous initiation of a load report by the network entity 105-*d* is supported may include transmitting, from the network entity 105-*d* to the CU 160-*e*, a capability message indicating a capability of the network entity 105-*d* to autonomously initiate transmission of multi-bit load reports. In some examples, communicating the indication that autonomous initiation of a load report by the network entity 105-*d* is supported may include receiving, at the network entity 105-*d* from the CU 160-*e*, a capability message indicating a capability of the CU 160-*e* to receive multi-bit load reports autonomously initiated by the network entity 105-*d*.

At 510, the network entity 105-*d* may measure at least one parameter associated with a communications load at the network entity 105-*d*.

At 515, the network entity 105-*d* may generate, in an absence of a request by the CU 160-*e* and in accordance with the indication, a multi-bit load report based at least in part on the at least one measured parameter.

At 520, the network entity 105-*d* may transmit, to the CU 160-*e* via the backhaul communications link, the multi-bit load report.

In some cases, network entity 105-*d* may generate the multi-bit load report on a per cell basis, a per network slice basis, a per SSB basis, a per traffic type basis, or a per communication direction basis. In some cases, the network entity 105-*d* may generate the multi-bit load report on a per BWP basis, a per resource block basis, or a per resource block group basis.

In some cases, measuring the at least one parameter at 510 includes measuring at least one of a hardware load, a TNL capacity, a composite capacity, a network slice availability, a communication resource availability, a PRB usage, or a number of active child network nodes. In some cases, measuring the at least one parameter at 510 includes measuring the at least one parameter associated with one of a TRP of the network entity 105-*d*, an RU of the network entity 105-*d*, a repeater of the network entity 105-*d*, or a reflective surface of the network entity 105-*d*, and the load report indicates the associated TRP of the network entity 105-*d*, an RU of the network entity 105-*d*, a repeater of the network entity 105-*d*, or a reflective surface of the network entity 105-*d*. In some cases, measuring the at least one parameter at 510 includes measuring the at least one parameter associated with the communications load associated with communications with a parent network entity and at least one child network entity in an operations mode including one of a set of enhanced multiplexing modes or a TDD mode, and the load report indicates the operations mode.

In some cases, the network entity 105-*d* may be an IAB node, and the network entity 105-*d* may transmit, with the multi-bit load report at 520, first information indicative of first resources that are available and second information indicative of second resources that are conditionally available.

Figure 6:
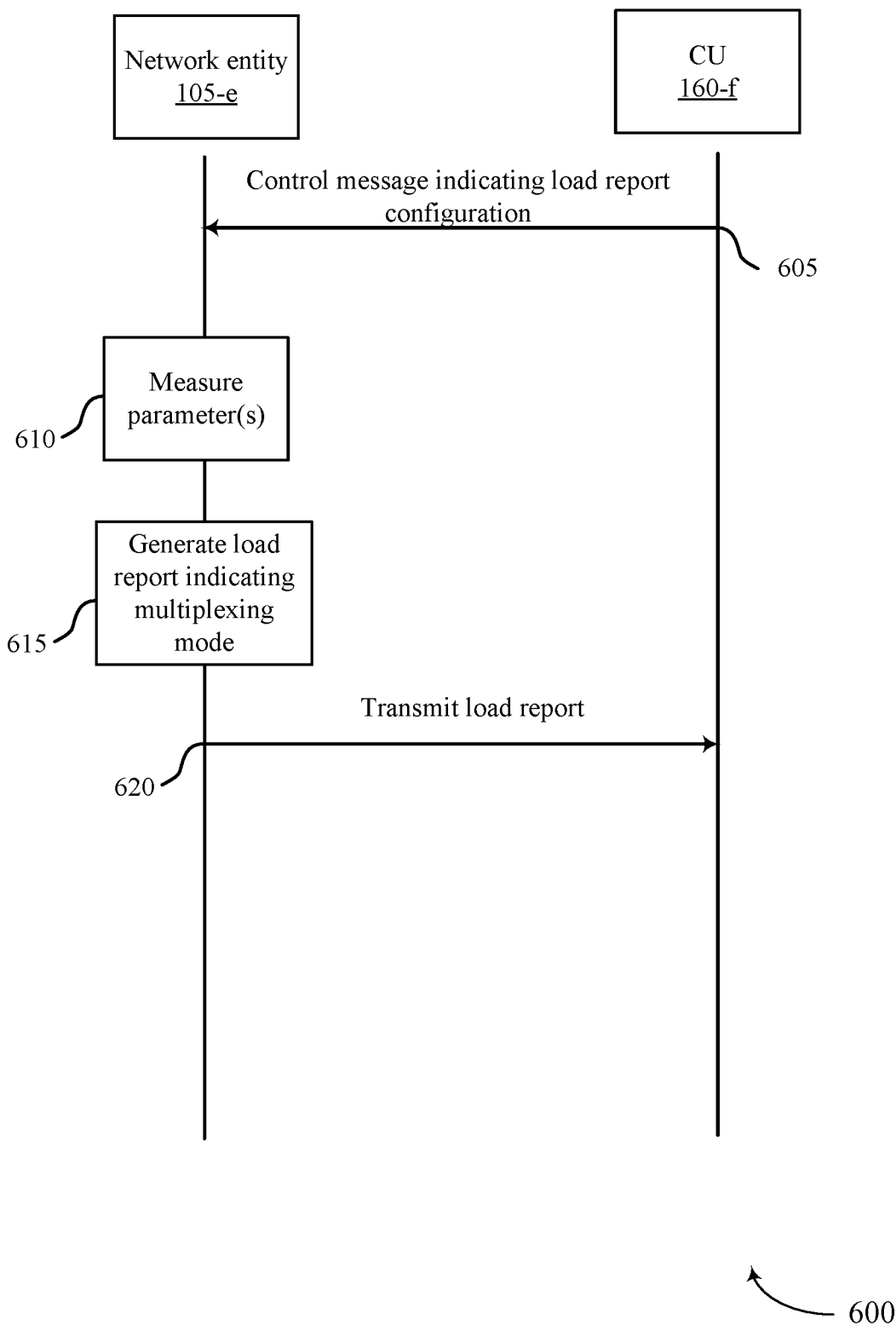
FIG. 6 illustrates an example of a process flow that supports load reporting in backhaul communications in accordance with one or more aspects of the present disclosure.

FIG. 6 illustrates an example of a process flow 600 that supports load reporting in backhaul communications in accordance with one or more aspects of the present disclosure. In some examples, the process flow 600 may implement aspects of wireless communications systems 100 or 300 or network architecture 200. The process flow 600 may include a network entity 105-*e*, which may be an example of a network entity 105 as described herein. For example, the network entity 105-*e* may be an example of a CU 160 as described herein or a DU 165 as described herein. The process flow may include a CU 160-*f*, which may be an example of a CU 160 as described herein. In the following description of the process flow 600, the operations between the network entity 105-*e* and the CU 160-*f* may be transmitted in a different order than the example order shown, or the operations performed by the network entity 105-*e* and the CU 160-*f* may be performed in different orders or at different times. Some operations may also be omitted from the process flow 600, and other operations may be added to the process flow 600.

At 605, the network entity 105-*e* may receive, from the CU 160-*f* via a backhaul communications link, a control message that indicates a load report configuration, where the load report configuration includes that the network entity 105-*e* is to report one or more multiplexing modes applied by the network entity 105-*e* to communications between the network entity 105-*e* and one or more parent network entities or one or more child network entities.

At 610, the network entity 105-*e* may measure at least one parameter associated with a communications load at the network entity 105-*e*.

At 615, the network entity 105-*e* may generate a load report to include an indication of the at least one parameter and at least one multiplexing mode applied by the network entity 105-*e*, the at least one multiplexing mode being in addition to a baseline TDD mode.

At 620, the network entity 105-*e* may transmit, to the CU 160-*f* via the backhaul communications link, the load report indicating the at least one measured parameter and the at least one multiplexing mode.

In some cases, receiving the control message at 605 includes receiving information indicative of one or more triggering conditions, and generating the load report at 615 is based on the at least one measured parameter satisfying at least one of the one or more triggering conditions. In some cases, the network entity 105-*e* may receive the information indicative of the one or more triggering conditions on a per cell basis, a per network slice basis, a per SSB basis, a per traffic type basis, or a per communication direction basis. In some cases, the network entity 105-*e* may receive the information indicative of the one or more triggering conditions on a per BWP basis, a per resource block basis, or a per resource block group basis. In some examples, the network entity 105-*e* may be an IAB node, and the network entity 105-*e* may receive the information indicative of the one or more triggering conditions on a per access basis, a per backhaul basis, or a per access and backhaul basis.

In some cases, measuring the at least one parameter at 610 includes measuring at least one of a hardware load, a TNL capacity, a composite capacity, a network slice availability, a communication resource availability, a PRB usage, or a number of active child network nodes. In some cases, measuring the at least one parameter at 610 includes measuring the at least one parameter associated with one of a TRP of the network entity 105-*e*, an RU of the network entity 105-*e*, a repeater of the network entity 105-*e*, or a reflective surface of the network entity 105-*e*, and the load report indicates the associated TRP of the network entity 105-*e*, RU of the network entity 105-*e*, repeater of the network entity 105-*e*, or reflective surface of the network entity 105-*e*.

In some cases, the network entity 105-*e* may be an IAB node, and the network entity 105-*e* may transmit, with the load report at 620, first information indicative of first resources that are available and second information indicative of second resources that are conditionally available.

Figure 7:
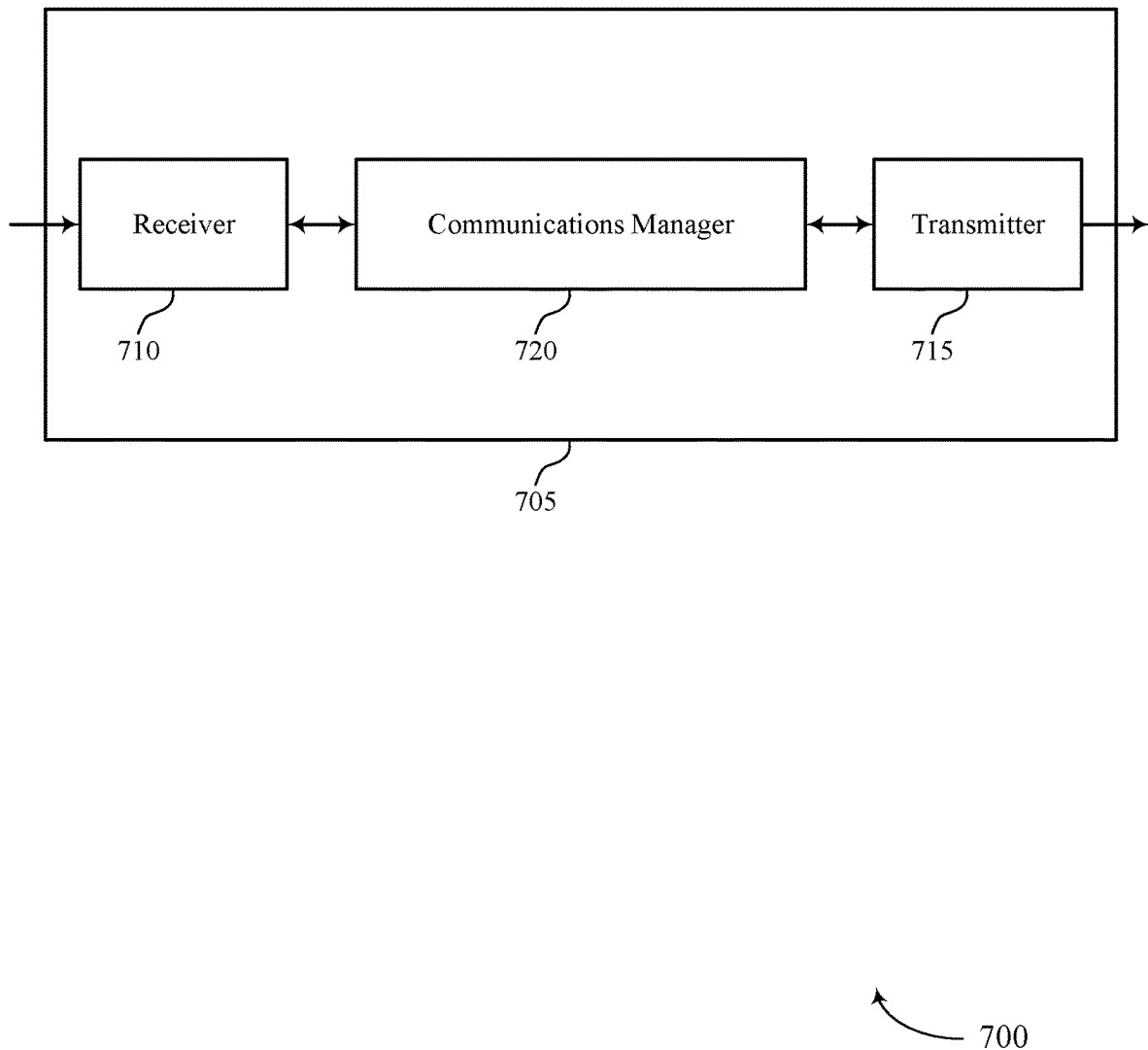
FIGS. 7 and 8 show block diagrams of devices that support load reporting in backhaul communications in accordance with one or more aspects of the present disclosure.

FIG. 7 shows a block diagram 700 of a device 705 that supports load reporting in backhaul communications in accordance with one or more aspects of the present disclosure. The device 705 may be an example of aspects of a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The communications manager 720, the receiver 710, the transmitter 715, or various combinations thereof or various components thereof may be examples of means for performing various aspects of load reporting in backhaul communications as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a network entity in accordance with examples as disclosed herein. For example, the communications manager 720 may be configured as or otherwise support a means for receiving, from a first CU and via a backhaul communications link, a control message including an indication of one or more triggering conditions for reporting of a load report from the network entity to the first CU, the one or more triggering conditions including at least upper or lower parameter thresholds, the network entity being one of a DU or a second CU. The communications manager 720 may be configured as or otherwise support a means for measuring at least one parameter associated with a communications load at the network entity. The communications manager 720 may be configured as or otherwise support a means for transmitting, to the first CU and via the backhaul communications link, based on the at least one measured parameter satisfying at least one of the upper or lower parameter thresholds of the one or more triggering conditions, the load report including the at least one measured parameter.

Additionally, or alternatively, the communications manager 720 may support wireless communications a network entity in accordance with examples as disclosed herein. For example, the communications manager 720 may be configured as or otherwise support a means for communicating, between the network entity and a first CU, an indication that autonomous initiation of a load report by the network entity is supported, the communicating being via a backhaul communications link between the network entity and the first CU, the network entity being one of a DU or a second CU. The communications manager 720 may be configured as or otherwise support a means for measuring at least one parameter associated with a communications load at the network entity. The communications manager 720 may be configured as or otherwise support a means for generating, in an absence of a request by the first CU and in accordance with the indication, a multi-bit load report based on the at least one measured parameter. The communications manager 720 may be configured as or otherwise support a means for transmitting, to the first CU and via the backhaul communications link, the multi-bit load report.

Additionally, or alternatively, the communications manager 720 may support wireless communications a network entity in accordance with examples as disclosed herein. For example, the communications manager 720 may be configured as or otherwise support a means for receiving, from a first CU and via a backhaul communications link, a control message that indicates a load report configuration, where the load report configuration includes that the network entity is to report one or more multiplexing modes applied by the network entity to communications between the network entity and one or more parent network entities or one or more child network entities, the network entity being one of a DU or a second CU. The communications manager 720 may be configured as or otherwise support a means for measuring at least one parameter associated with a communications load associated with the communications. The communications manager 720 may be configured as or otherwise support a means for generating a load report to include an indication of the at least one parameter and at least one multiplexing mode applied by the network entity, the at least one multiplexing mode being in addition to a baseline TDD mode. The communications manager 720 may be configured as or otherwise support a means for transmitting, to the first CU and via the backhaul communications link, the load report indicating the at least one measured parameter and the at least one multiplexing mode.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing, reduced power consumption, and more efficient utilization of communication resources by enabling aperiodic and/or enhanced backhaul load reporting.

Figure 8:
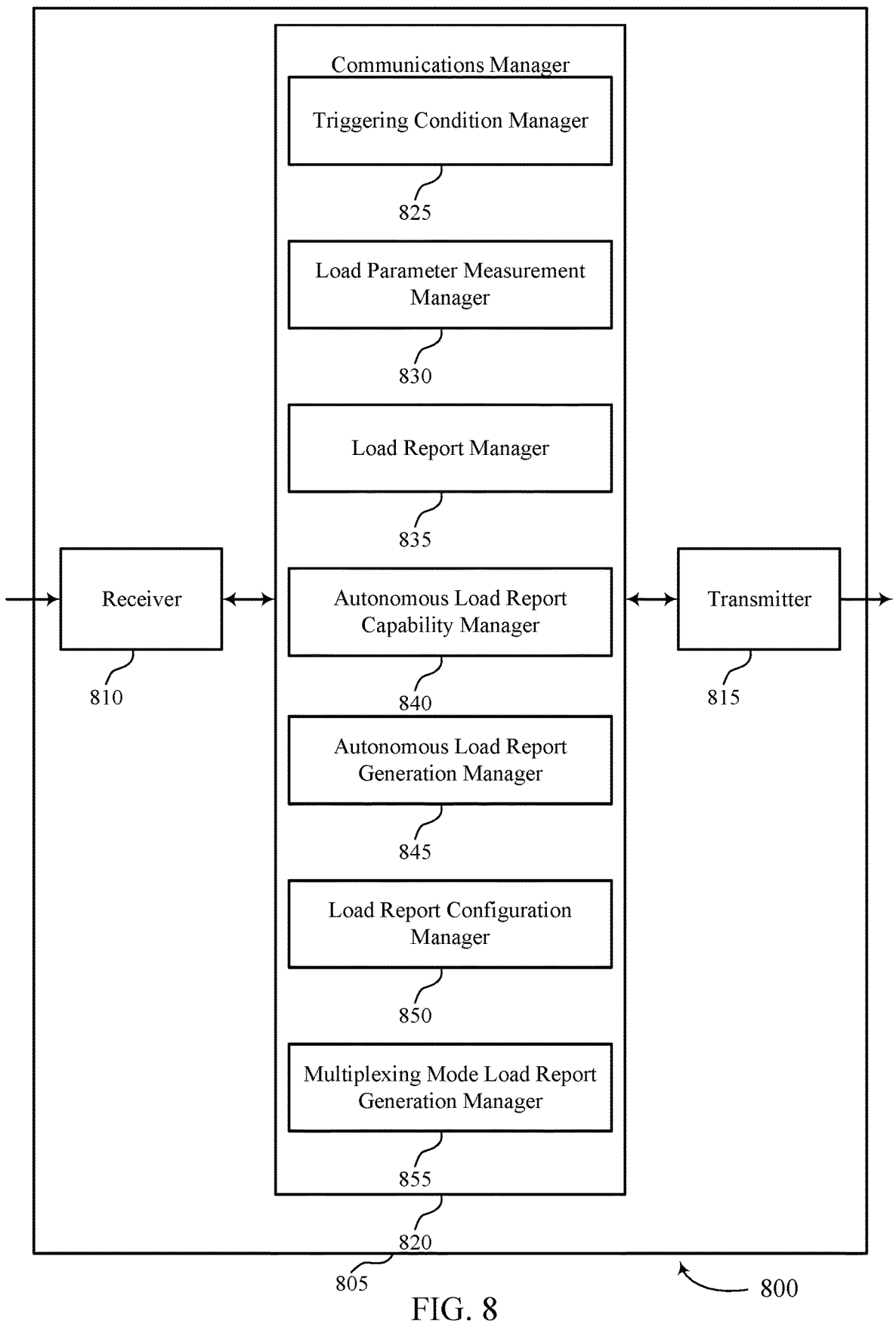

FIG. 8 shows a block diagram 800 of a device 805 that supports load reporting in backhaul communications in accordance with one or more aspects of the present disclosure. The device 805 may be an example of aspects of a device 705 or a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The device 805, or various components thereof, may be an example of means for performing various aspects of load reporting in backhaul communications as described herein. For example, the communications manager 820 may include a triggering condition manager 825, a load parameter measurement manager 830, a load report manager 835, an autonomous load report capability manager 840, an autonomous load report generation manager 845, a load report configuration manager 850, a multiplexing mode load report generation manager 855, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a network entity in accordance with examples as disclosed herein. The triggering condition manager 825 may be configured as or otherwise support a means for receiving, from a first CU and via a backhaul communications link, a control message including an indication of one or more triggering conditions for reporting of a load report from the network entity to the first CU, the one or more triggering conditions including at least upper or lower parameter thresholds, the network entity being one of a DU or a second CU. The load parameter measurement manager 830 may be configured as or otherwise support a means for measuring at least one parameter associated with a communications load at the network entity. The load report manager 835 may be configured as or otherwise support a means for transmitting, to the first CU and via the backhaul communications link, based on the at least one measured parameter satisfying at least one of the upper or lower parameter thresholds of the one or more triggering conditions, the load report including the at least one measured parameter.

Additionally, or alternatively, the communications manager 820 may support wireless communications a network entity in accordance with examples as disclosed herein. The autonomous load report capability manager 840 may be configured as or otherwise support a means for communicating, between the network entity and a first CU, an indication that autonomous initiation of a load report by the network entity is supported, the communicating being via a backhaul communications link between the network entity and the first centralized unit, the network entity being one of a DU or a second CU. The load parameter measurement manager 830 may be configured as or otherwise support a means for measuring at least one parameter associated with a communications load at the network entity. The autonomous load report generation manager 845 may be configured as or otherwise support a means for generating, in an absence of a request by the first CU and in accordance with the indication, a multi-bit load report based on the at least one measured parameter. The load report manager 835 may be configured as or otherwise support a means for transmitting, to the first CU and via the backhaul communications link, the multi-bit load report.

Additionally, or alternatively, the communications manager 820 may support wireless communications a network entity in accordance with examples as disclosed herein. The load report configuration manager 850 may be configured as or otherwise support a means for receiving, from a first CU and via a backhaul communications link, a control message that indicates a load report configuration, where the load report configuration includes that the network entity is to report one or more multiplexing modes applied by the network entity to communications between the network entity and one or more parent network entities or one or more child network entities, the network entity being one of a DU or a second CU. The load parameter measurement manager 830 may be configured as or otherwise support a means for measuring at least one parameter associated with a communications load associated with the communications. The multiplexing mode load report generation manager 855 may be configured as or otherwise support a means for generating a load report to include an indication of the at least one parameter and at least one multiplexing mode applied by the network entity, the at least one multiplexing mode being in addition to a baseline TDD mode. The load report manager 835 may be configured as or otherwise support a means for transmitting, to the first CU and via the backhaul communications link, the load report indicating the at least one measured parameter and the at least one multiplexing mode.

Figure 9:
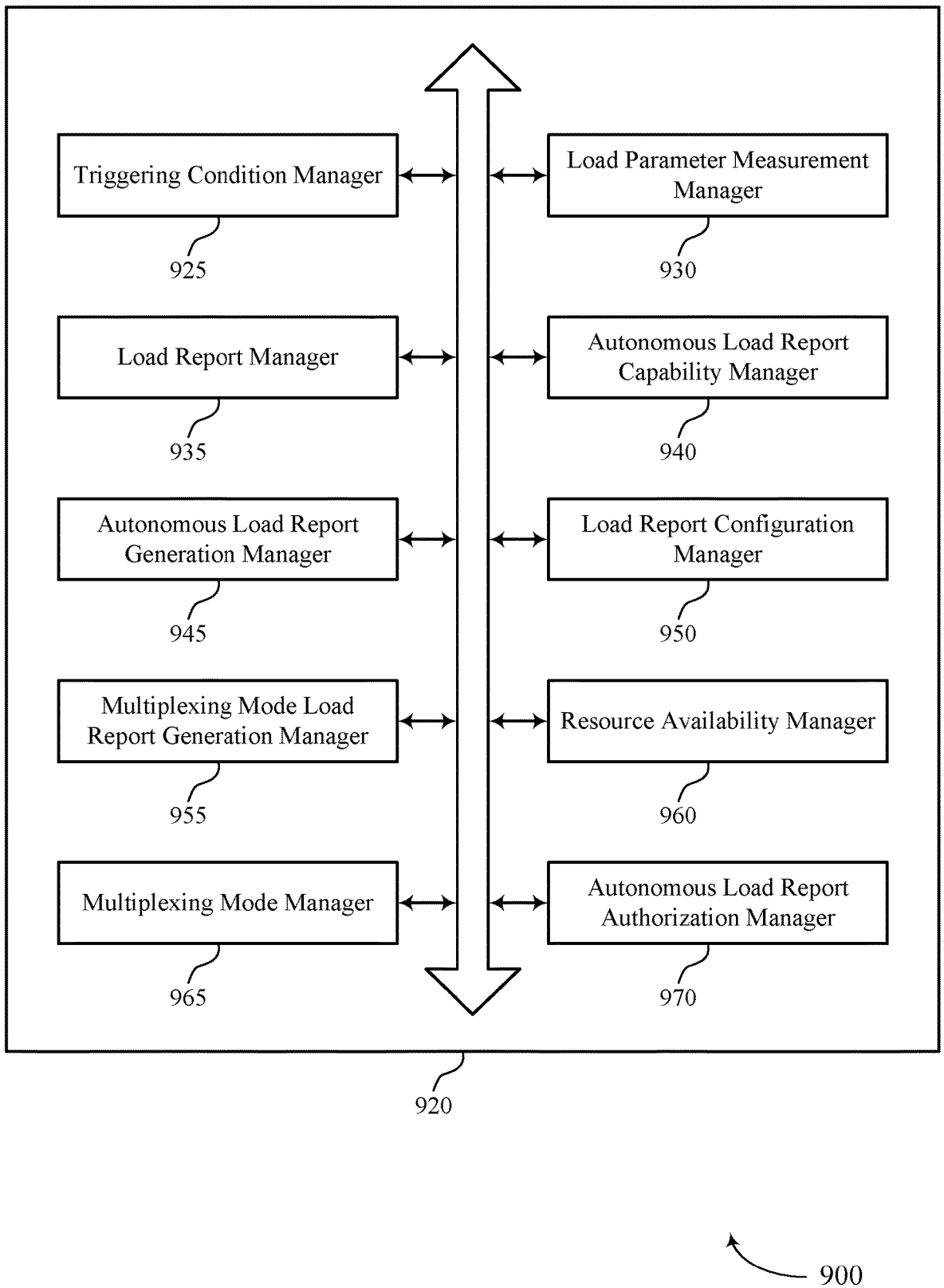
FIG. 9 shows a block diagram of a communications manager that supports load reporting in backhaul communications in accordance with one or more aspects of the present disclosure.

FIG. 9 shows a block diagram 900 of a communications manager 920 that supports load reporting in backhaul communications in accordance with one or more aspects of the present disclosure. The communications manager 920 may be an example of aspects of a communications manager 720, a communications manager 820, or both, as described herein. The communications manager 920, or various components thereof, may be an example of means for performing various aspects of load reporting in backhaul communications as described herein. For example, the communications manager 920 may include a triggering condition manager 925, a load parameter measurement manager 930, a load report manager 935, an autonomous load report capability manager 940, an autonomous load report generation manager 945, a load report configuration manager 950, a multiplexing mode load report generation manager 955, a resource availability manager 960, a multiplexing mode manager 965, an autonomous load report authorization manager 970, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 920 may support wireless communications at a network entity in accordance with examples as disclosed herein. The triggering condition manager 925 may be configured as or otherwise support a means for receiving, from a first CU and via a backhaul communications link, a control message including an indication of one or more triggering conditions for reporting of a load report from the network entity to the first CU, the one or more triggering conditions including at least upper or lower parameter thresholds, the network entity being one of a DU or a second CU. The load parameter measurement manager 930 may be configured as or otherwise support a means for measuring at least one parameter associated with a communications load at the network entity. The load report manager 935 may be configured as or otherwise support a means for transmitting, to the first CU and via the backhaul communications link, based on the at least one measured parameter satisfying at least one of the upper or lower parameter thresholds of the one or more triggering conditions, the load report including the at least one measured parameter.

In some examples, the triggering condition manager 925 may be configured as or otherwise support a means for receiving the indication of the one or more triggering conditions on a per cell basis, a per network slice basis, a per SSB basis, a per traffic type basis, or a per communication direction basis.

In some examples, to support measuring the at least one parameter, the load parameter measurement manager 930 may be configured as or otherwise support a means for measuring at least one of a hardware load, a transport network layer capacity, a composite capacity, a network slice availability, a communication resource availability, a physical resource block usage, or a number of active child network nodes.

In some examples, to support measuring the at least one parameter, the load parameter measurement manager 930 may be configured as or otherwise support a means for measuring the at least one parameter associated with one of a transmission and reception point of the network entity, a RU of the network entity, a repeater of the network entity, or a reflective surface of the network entity, and where the load report indicates the associated one of the transmission and reception point of the network entity, the RU of the network entity, the repeater of the network entity, or the reflective surface of the network entity.

In some examples, to support the network entity may be an IAB node, and the triggering condition manager 925 may be configured as or otherwise support a means for receiving the indication of the one or more triggering conditions on a per access basis, a per backhaul basis, or a per access and backhaul basis.

In some examples, the network entity may be an IAB node, and the resource availability manager 960 may be configured as or otherwise support a means for transmitting, with the load report, first information indicative of first resources that are available and second information indicative of second resources that are conditionally available.

In some examples, the triggering condition manager 925 may be configured as or otherwise support a means for receiving the indication of the one or more triggering conditions on a per BWP basis, a per resource block basis, or a per resource block group basis.

In some examples, to support measuring the at least one parameter, the multiplexing mode manager 965 may be configured as or otherwise support a means for measuring the at least one parameter associated with the communications load associated with communications with a parent network entity and at least one child network entity in an operations mode including one of a set of enhanced multiplexing modes or a TDD mode, and where the load report indicates the operations mode.

Additionally, or alternatively, the communications manager 920 may support wireless communications a network entity in accordance with examples as disclosed herein. The autonomous load report capability manager 940 may be configured as or otherwise support a means for communicating, between the network entity and a first CU, an indication that autonomous initiation of a load report by the network entity is supported, the communicating being via a backhaul communications link between the network entity and the first CU, the network entity being one of a DU or a second CU. In some examples, the load parameter measurement manager 930 may be configured as or otherwise support a means for measuring at least one parameter associated with a communications load at the network entity. The autonomous load report generation manager 945 may be configured as or otherwise support a means for generating, in an absence of a request by the first CU and in accordance with the indication, a multi-bit load report based on the at least one measured parameter. In some examples, the load report manager 935 may be configured as or otherwise support a means for transmitting, to the first CU and via the backhaul communications link, the multi-bit load report.

In some examples, to support communicating the indication that autonomous initiation of the load report by the network entity is supported, the autonomous load report authorization manager 970 may be configured as or otherwise support a means for receiving, from the first CU, a control message authorizing the network entity to initiate multi-bit load reports.

In some examples, to support communicating the indication that autonomous initiation of the load report by the network entity is supported, the autonomous load report capability manager 940 may be configured as or otherwise support a means for transmitting, to the first CU, a capability message indicating a capability of the network entity to autonomously initiate transmission of multi-bit load reports.

In some examples, to support communicating the indication that autonomous initiation of the load report by the network entity is supported, the autonomous load report capability manager 940 may be configured as or otherwise support a means for receiving, from the first CU, a capability message indicating a capability of the first CU to receive multi-bit load reports autonomously initiated by the network entity.

In some examples, the autonomous load report generation manager 945 may be configured as or otherwise support a means for generating the multi-bit load report on a per cell basis, a per network slice basis, a per SSB basis, a per traffic type basis, or a per communication direction basis.

In some examples, to support measuring the at least one parameter, the load parameter measurement manager 930 may be configured as or otherwise support a means for measuring at least one of a hardware load, a transport network layer capacity, a composite capacity, a network slice availability, a communication resource availability, a physical resource block usage, or a number of active child network nodes.

In some examples, to support measuring the at least one parameter, the load parameter measurement manager 930 may be configured as or otherwise support a means for measuring the at least one parameter associated with one of a transmission and reception point of the network entity, a RU of the network entity, a repeater of the network entity, or a reflective surface of the network entity, and where the multi-bit load report indicates the associated one of the transmission and reception point of the network entity, the RU of the network entity, the repeater of the network entity, or the reflective surface of the network entity.

In some examples, the network entity may be an IAB node, and the load report manager 935 may be configured as or otherwise support a means for transmitting, with the multi-bit load report, first information indicative of first resources that are available and second information indicative of second resources that are conditionally available.

In some examples, the autonomous load report generation manager 945 may be configured as or otherwise support a means for generating the multi-bit load report on a per BWP basis, a per resource block basis, or a per resource block group basis.

In some examples, to support measuring the at least one parameter, the multiplexing mode manager 965 may be configured as or otherwise support a means for measuring the at least one parameter associated with the communications load associated with communications with a parent network entity and at least one child network entity in an operations mode including one of a set of enhanced multiplexing modes or a TDD mode, and where the multi-bit load report indicates the operations mode.

Additionally, or alternatively, the communications manager 920 may support wireless communications a network entity in accordance with examples as disclosed herein. The load report configuration manager 950 may be configured as or otherwise support a means for receiving, from a first CU and via a backhaul communications link, a control message that indicates a load report configuration, where the load report configuration includes that the network entity is to report one or more multiplexing modes applied by the network entity to communications between the network entity and one or more parent network entities or one or more child network entities, the network entity being one of a DU or a second CU. In some examples, the load parameter measurement manager 930 may be configured as or otherwise support a means for measuring at least one parameter associated with a communications load associated with the communications. The multiplexing mode load report generation manager 955 may be configured as or otherwise support a means for generating a load report to include an indication of the at least one parameter and at least one multiplexing mode applied by the network entity, the at least one multiplexing mode being in addition to a baseline TDD mode. In some examples, the load report manager 935 may be configured as or otherwise support a means for transmitting, to the first CU and via the backhaul communications link, the load report indicating the at least one measured parameter and the at least one multiplexing mode.

In some examples, to support receiving the control message, the triggering condition manager 925 may be configured as or otherwise support a means for receiving information indicative of one or more triggering conditions, where generating the load report is based on the at least one measured parameter satisfying at least one of the one or more triggering conditions.

In some examples, the triggering condition manager 925 may be configured as or otherwise support a means for receiving the information indicative of the one or more triggering conditions on a per cell basis, a per network slice basis, a per SSB basis, a per traffic type basis, or a per communication direction basis.

In some examples, the network entity may be an IAB node, and the triggering condition manager 925 may be configured as or otherwise support a means for receiving the information indicative of the one or more triggering conditions on a per access basis, a per backhaul basis, or a per access and backhaul basis.

In some examples, the triggering condition manager 925 may be configured as or otherwise support a means for receiving the information indicative of the one or more triggering conditions on a per BWP basis, a per resource block basis, or a per resource block group basis.

In some examples, to support measuring the at least one parameter, the load parameter measurement manager 930 may be configured as or otherwise support a means for measuring at least one of a hardware load, a transport network layer capacity, a composite capacity, a network slice availability, a communication resource availability, a physical resource block usage, or a number of active child network nodes.

In some examples, to support measuring the at least one parameter, the load parameter measurement manager 930 may be configured as or otherwise support a means for measuring the at least one parameter associated with one of a transmission and reception point of the network entity, a RU of the network entity, a repeater of the network entity, or a reflective surface of the network entity, and where the load report indicates the associated one of the transmission and reception point of the network entity, the RU of the network entity, the repeater of the network entity, or the reflective surface of the network entity.

In some examples, the network entity may be an IAB node, and the resource availability manager 960 may be configured as or otherwise support a means for transmitting, with the load report, first information indicative of first resources that are available and second information indicative of second resources that are conditionally available.

In some examples, to support measuring the at least one parameter, the multiplexing mode manager 965 may be configured as or otherwise support a means for measuring the at least one parameter associated with the communications load associated with communications with a parent network entity and at least one child network entity in an operations mode including one of a set of enhanced multiplexing modes or a TDD mode, and where the load report indicates the operations mode.

Figure 10:
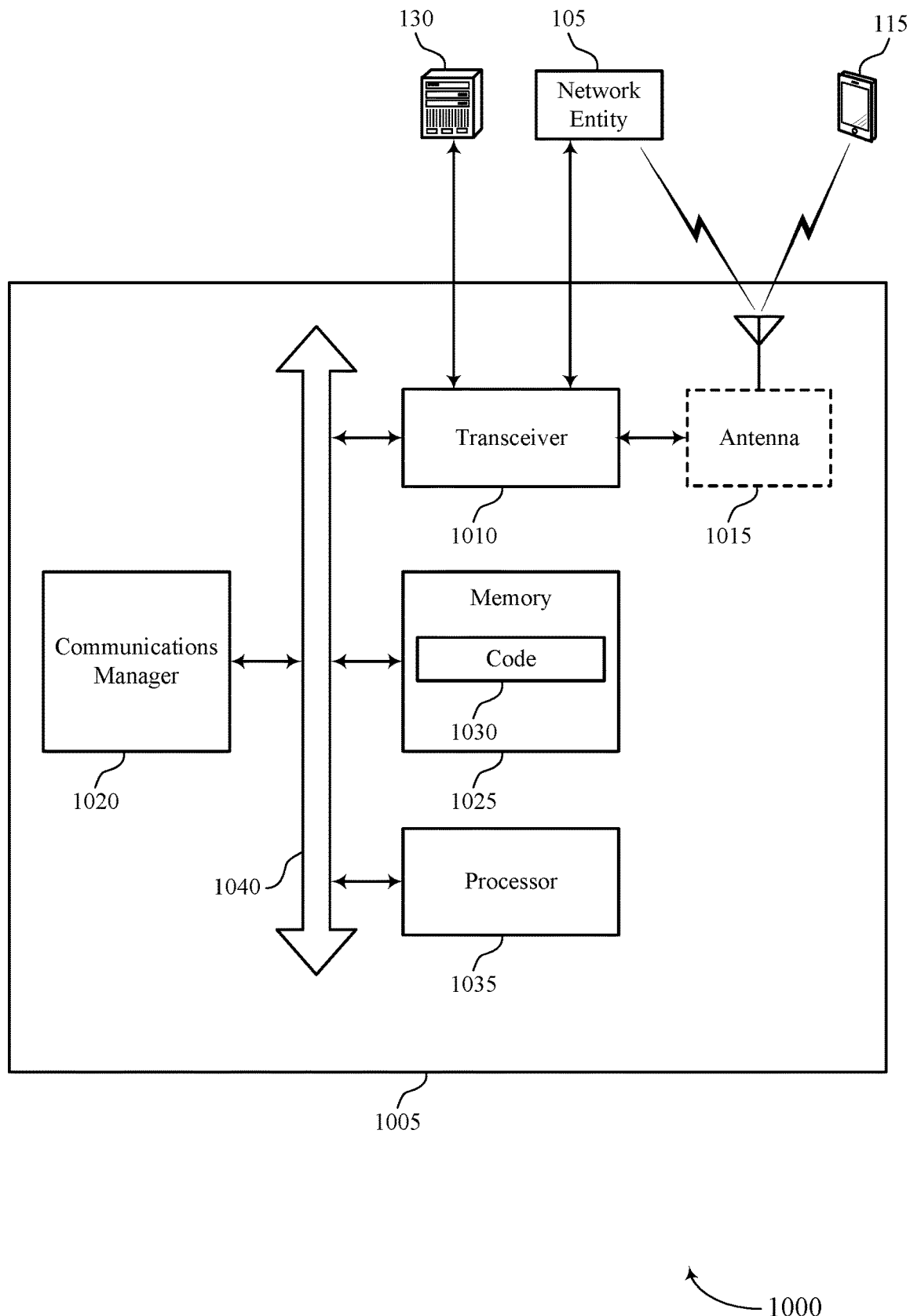
FIG. 10 shows a diagram of a system including a device that supports load reporting in backhaul communications in accordance with one or more aspects of the present disclosure.

FIG. 10 shows a diagram of a system 1000 including a device 1005 that supports load reporting in backhaul communications in accordance with one or more aspects of the present disclosure. The device 1005 may be an example of or include the components of a device 705, a device 805, or a network entity 105 as described herein. The device 1005 may communicate with one or more network entities 105, one or more UEs 115, or any combination thereof, which may include communications over one or more wired interfaces, over one or more wireless interfaces, or any combination thereof. The device 1005 may include components that support outputting and obtaining communications, such as a communications manager 1020, a transceiver 1010, an antenna 1015, a memory 1025, code 1030, and a processor 1035. These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some examples, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some examples, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. The transceiver 1010, or the transceiver 1010 and one or more antennas 1015 or wired interfaces, where applicable, may be an example of a transmitter 715, a transmitter 815, a receiver 710, a receiver 810, or any combination thereof or component thereof, as described herein. In some examples, the transceiver may be operable to support communications via one or more communications links (e.g., a communications link 125, a backhaul communications link 120, a midhaul communications link 162, a fronthaul communications link 168).

The memory 1025 may include random access memory (RAM) and read-only memory (ROM). The memory 1025 may store computer-readable, computer-executable code 1030 including instructions that, when executed by the processor 1035, cause the device 1005 to perform various functions described herein. The code 1030 may be stored in a non-transitory computer-readable medium such as system memory or another type of memory. In some cases, the code 1030 may not be directly executable by the processor 1035 but may cause a computer (e.g., when compiled and executed) to perform functions described herein. In some cases, the memory 1025 may contain, among other things, a basic I/O system (BIOS) which may control basic hardware or software operation such as the interaction with peripheral components or devices.

The processor 1035 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1035 may be configured to operate a memory array using a memory controller. In some other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting load reporting in backhaul communications). For example, the device 1005 or a component of the device 1005 may include a processor 1035 and memory 1025 coupled with the processor 1035, the processor 1035 and memory 1025 configured to perform various functions described herein. The processor 1035 may be an example of a cloud-computing platform (e.g., one or more physical nodes and supporting software such as operating systems, virtual machines, or container instances) that may host the functions (e.g., by executing code 1030) to perform the functions of the device 1005.

In some examples, a bus 1040 may support communications of (e.g., within) a protocol layer of a protocol stack. In some examples, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the memory 1025, the code 1030, and the processor 1035 may be located in one of the different components or divided between different components).

In some examples, the communications manager 1020 may manage aspects of communications with a core network 130 (e.g., via one or more wired or wireless backhaul links). For example, the communications manager 1020 may manage the transfer of data communications for client devices, such as one or more UEs 115. In some examples, the communications manager 1020 may manage communications with other network entities 105, and may include a controller or scheduler for controlling communications with UEs 115 in cooperation with other network entities 105. In some examples, the communications manager 1020 may support an X2 interface within an LTE/LTE-A wireless communications network technology to provide communication between network entities 105.

The communications manager 1020 may support wireless communications at a network entity in accordance with examples as disclosed herein. For example, the communications manager 1020 may be configured as or otherwise support a means for receiving, from a first CU and via a backhaul communications link, a control message including an indication of one or more triggering conditions for reporting of a load report from the network entity to the first CU, the one or more triggering conditions including at least upper or lower parameter thresholds, the network entity being one of a DU or a second CU. The communications manager 1020 may be configured as or otherwise support a means for measuring at least one parameter associated with a communications load at the network entity. The communications manager 1020 may be configured as or otherwise support a means for transmitting, to the first CU and via the backhaul communications link, based on the at least one measured parameter satisfying at least one of the upper or lower parameter thresholds of the one or more triggering conditions, the load report including the at least one measured parameter.

Additionally, or alternatively, the communications manager 1020 may support wireless communications a network entity in accordance with examples as disclosed herein. For example, the communications manager 1020 may be configured as or otherwise support a means for communicating, between the network entity and a first CU, an indication that autonomous initiation of a load report by the network entity is supported, the communicating being via a backhaul communications link between the network entity and the first CU, the network entity being one of a DU or a second CU. The communications manager 1020 may be configured as or otherwise support a means for measuring at least one parameter associated with a communications load at the network entity. The communications manager 1020 may be configured as or otherwise support a means for generating, in an absence of a request by the first CU and in accordance with the indication, a multi-bit load report based on the at least one measured parameter. The communications manager 1020 may be configured as or otherwise support a means for transmitting, to the first CU and via the backhaul communications link, the multi-bit load report.

Additionally, or alternatively, the communications manager 1020 may support wireless communications a network entity in accordance with examples as disclosed herein. For example, the communications manager 1020 may be configured as or otherwise support a means for receiving, from a first CU and via a backhaul communications link, a control message that indicates a load report configuration, where the load report configuration includes that the network entity is to report one or more multiplexing modes applied by the network entity to communications between the network entity and one or more parent network entities or one or more child network entities, the network entity being one of a DU or a second CU. The communications manager 1020 may be configured as or otherwise support a means for measuring at least one parameter associated with a communications load associated with the communications. The communications manager 1020 may be configured as or otherwise support a means for generating a load report to include an indication of the at least one parameter and at least one multiplexing mode applied by the network entity, the at least one multiplexing mode being in addition to a baseline TDD mode. The communications manager 1020 may be configured as or otherwise support a means for transmitting, to the first CU and via the backhaul communications link, the load report indicating the at least one measured parameter and the at least one multiplexing mode.

By including or configuring the communications manager 1020 in accordance with examples as described herein, the device 1005 may support techniques for reduced power consumption, more efficient utilization of communication resources, improved coordination between devices, and improved utilization of processing capability by enabling aperiodic and/or enhanced backhaul load reporting.

In some examples, the communications manager 1020 may be configured to perform various operations (e.g., receiving, obtaining, monitoring, outputting, transmitting) using or otherwise in cooperation with the transceiver 1010, the one or more antennas 1015 (e.g., where applicable), or any combination thereof. Although the communications manager 1020 is illustrated as a separate component, in some examples, one or more functions described with reference to the communications manager 1020 may be supported by or performed by the processor 1035, the memory 1025, the code 1030, the transceiver 1010, or any combination thereof. For example, the code 1030 may include instructions executable by the processor 1035 to cause the device 1005 to perform various aspects of load reporting in backhaul communications as described herein, or the processor 1035 and the memory 1025 may be otherwise configured to perform or support such operations.

Figure 11:
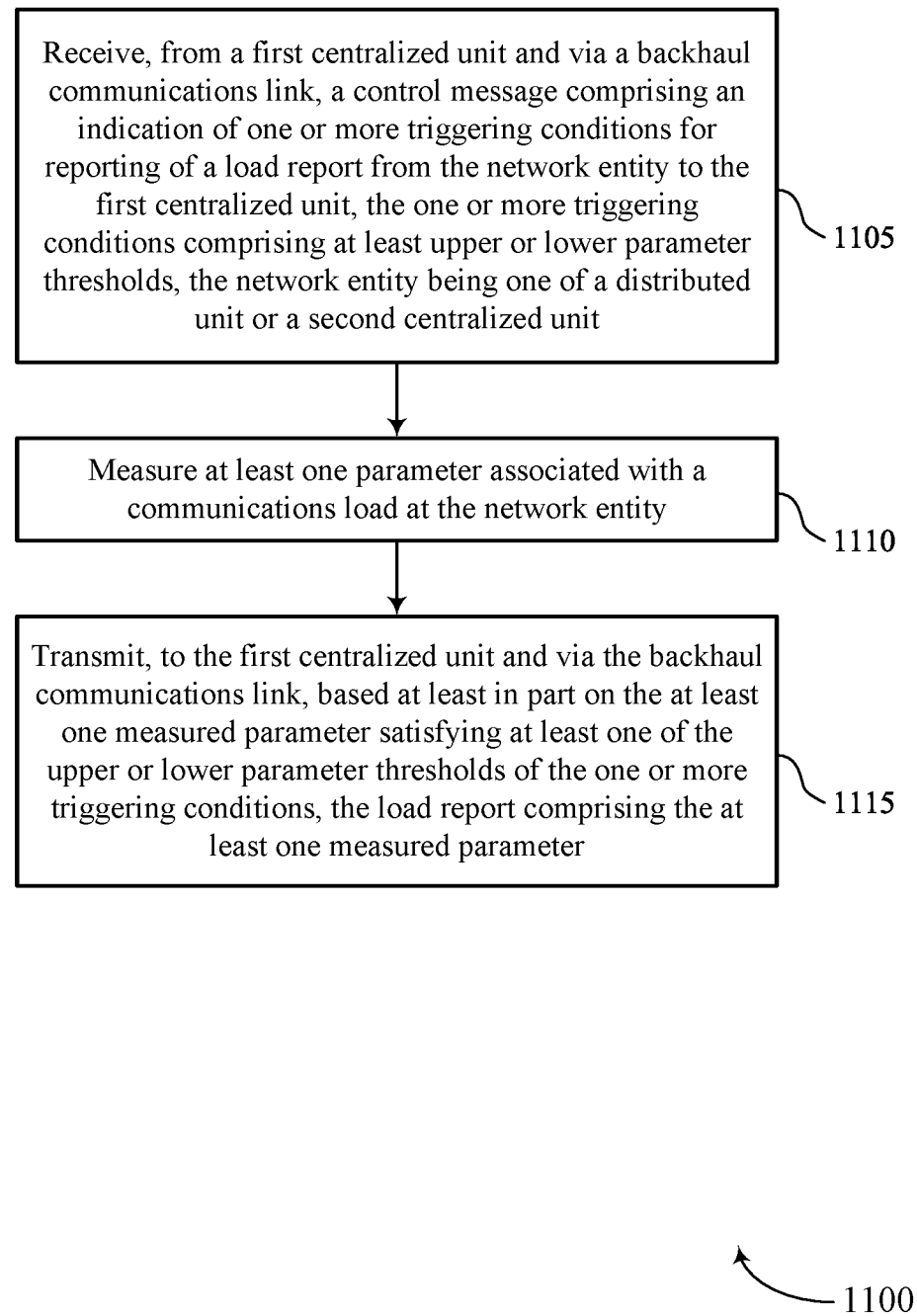
FIGS. 11 through 18 show flowcharts illustrating methods that support load reporting in backhaul communications in accordance with one or more aspects of the present disclosure.

FIG. 11 shows a flowchart illustrating a method 1100 that supports load reporting in backhaul communications in accordance with one or more aspects of the present disclosure. The operations of the method 1100 may be implemented by a network entity or its components as described herein. For example, the operations of the method 1100 may be performed by a network entity as described with reference to FIGS. 1 through 10. In some examples, a network entity may execute a set of instructions to control the functional elements of the network entity to perform the described functions. Additionally, or alternatively, the network entity may perform aspects of the described functions using special-purpose hardware.

At 1105, the method may include receiving, from a first CU and via a backhaul communications link, a control message including an indication of one or more triggering conditions for reporting of a load report from the network entity to the first CU, the one or more triggering conditions including at least upper or lower parameter thresholds, the network entity being one of a DU or a second CU. The operations of 1105 may be performed in accordance with examples as disclosed herein. In some examples, aspects of the operations of 1105 may be performed by a triggering condition manager 925 as described with reference to FIG. 9.

At 1110, the method may include measuring at least one parameter associated with a communications load at the network entity. The operations of 1110 may be performed in accordance with examples as disclosed herein. In some examples, aspects of the operations of 1110 may be performed by a load parameter measurement manager 930 as described with reference to FIG. 9.

At 1115, the method may include transmitting, to the first CU and via the backhaul communications link, based on the at least one measured parameter satisfying at least one of the upper or lower parameter thresholds of the one or more triggering conditions, the load report including the at least one measured parameter. The operations of 1115 may be performed in accordance with examples as disclosed herein. In some examples, aspects of the operations of 1115 may be performed by a load report manager 935 as described with reference to FIG. 9.

Figure 12:
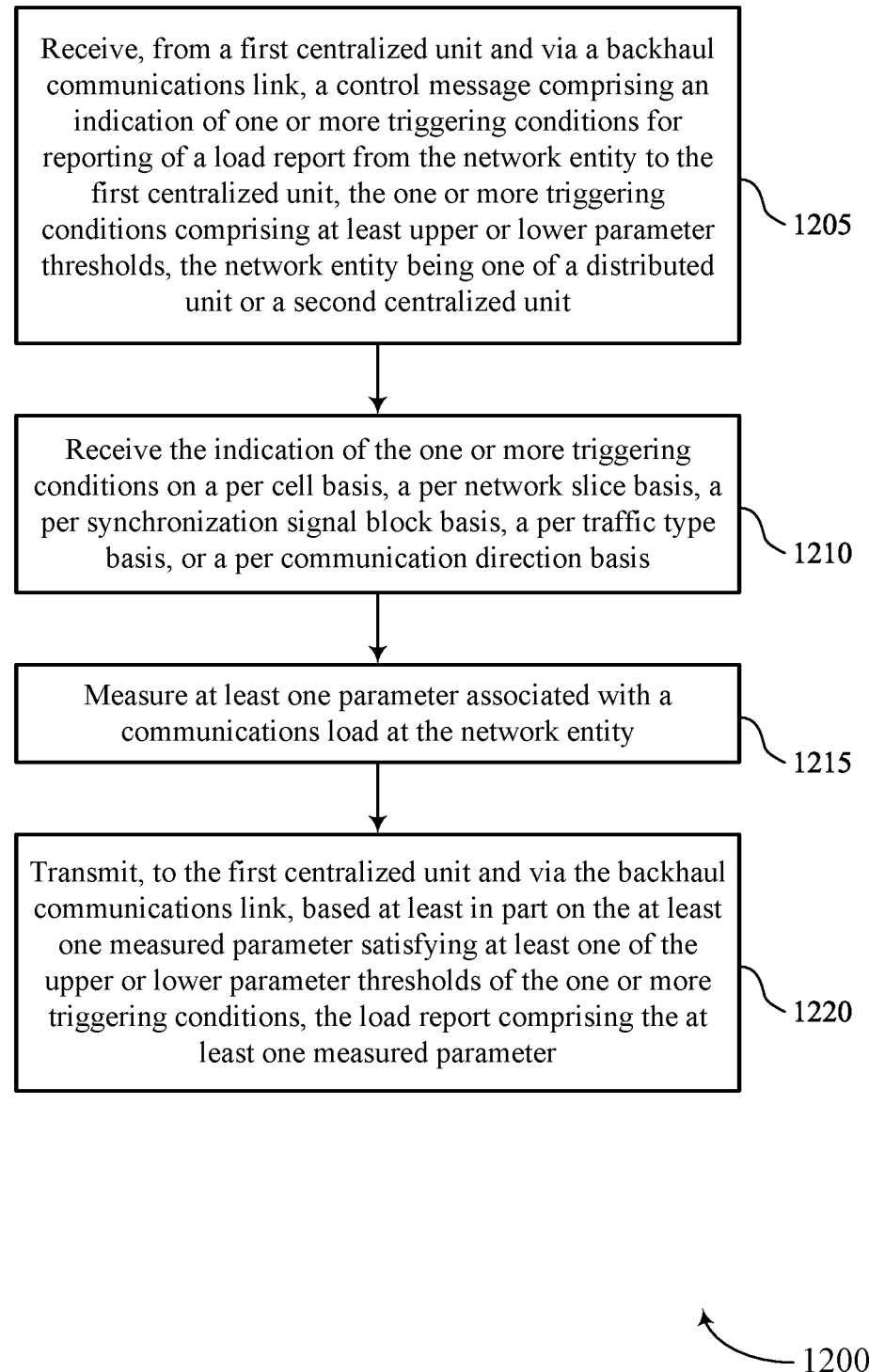

FIG. 12 shows a flowchart illustrating a method 1200 that supports load reporting in backhaul communications in accordance with one or more aspects of the present disclosure. The operations of the method 1200 may be implemented by a network entity or its components as described herein. For example, the operations of the method 1200 may be performed by a network entity as described with reference to FIGS. 1 through 10. In some examples, a network entity may execute a set of instructions to control the functional elements of the network entity to perform the described functions. Additionally, or alternatively, the network entity may perform aspects of the described functions using special-purpose hardware.

At 1205, the method may include receiving, from a first CU and via a backhaul communications link, a control message including an indication of one or more triggering conditions for reporting of a load report from the network entity to the first CU, the one or more triggering conditions including at least upper or lower parameter thresholds, the network entity being one of a DU or a second CU. The operations of 1205 may be performed in accordance with examples as disclosed herein. In some examples, aspects of the operations of 1205 may be performed by a triggering condition manager 925 as described with reference to FIG. 9.

At 1210, the method may include receiving the indication of the one or more triggering conditions on a per cell basis, a per network slice basis, a per SSB basis, a per traffic type basis, or a per communication direction basis. The operations of 1210 may be performed in accordance with examples as disclosed herein. In some examples, aspects of the operations of 1210 may be performed by a triggering condition manager 925 as described with reference to FIG. 9.

At 1215, the method may include measuring at least one parameter associated with a communications load at the network entity. The operations of 1215 may be performed in accordance with examples as disclosed herein. In some examples, aspects of the operations of 1215 may be performed by a load parameter measurement manager 930 as described with reference to FIG. 9.

At 1220, the method may include transmitting, to the first CU and via the backhaul communications link, based on the at least one measured parameter satisfying at least one of the upper or lower parameter thresholds of the one or more triggering conditions, the load report including the at least one measured parameter. The operations of 1220 may be performed in accordance with examples as disclosed herein. In some examples, aspects of the operations of 1220 may be performed by a load report manager 935 as described with reference to FIG. 9.

Figure 13:
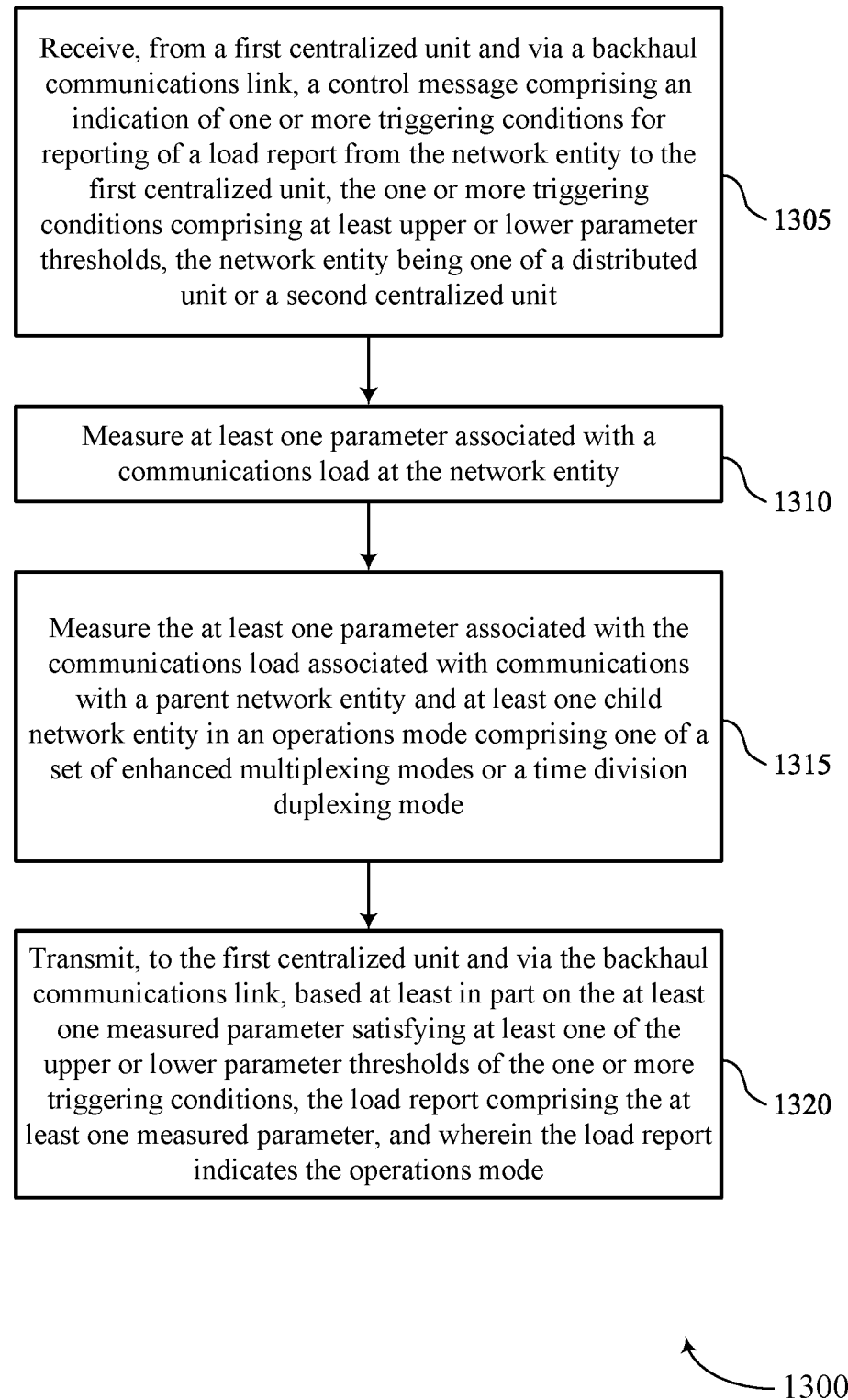

FIG. 13 shows a flowchart illustrating a method 1300 that supports load reporting in backhaul communications in accordance with one or more aspects of the present disclosure. The operations of the method 1300 may be implemented by a network entity or its components as described herein. For example, the operations of the method 1300 may be performed by a network entity as described with reference to FIGS. 1 through 10. In some examples, a network entity may execute a set of instructions to control the functional elements of the network entity to perform the described functions. Additionally, or alternatively, the network entity may perform aspects of the described functions using special-purpose hardware.

At 1305, the method may include receiving, from a first CU and via a backhaul communications link, a control message including an indication of one or more triggering conditions for reporting of a load report from the network entity to the first CU, the one or more triggering conditions including at least upper or lower parameter thresholds, the network entity being one of a DU or a second CU. The operations of 1305 may be performed in accordance with examples as disclosed herein. In some examples, aspects of the operations of 1305 may be performed by a triggering condition manager 925 as described with reference to FIG. 9.

At 1310, the method may include measuring at least one parameter associated with a communications load at the network entity. The operations of 1310 may be performed in accordance with examples as disclosed herein. In some examples, aspects of the operations of 1310 may be performed by a load parameter measurement manager 930 as described with reference to FIG. 9.

At 1315, the method may include measuring the at least one parameter associated with the communications load associated with communications with a parent network entity and at least one child network entity in an operations mode including one of a set of enhanced multiplexing modes or a TDD mode. The operations of 1315 may be performed in accordance with examples as disclosed herein. In some examples, aspects of the operations of 1315 may be performed by a multiplexing mode manager 965 as described with reference to FIG. 9.

At 1320, the method may include transmitting, to the first CU and via the backhaul communications link, based on the at least one measured parameter satisfying at least one of the upper or lower parameter thresholds of the one or more triggering conditions, the load report including the at least one measured parameter, and where the load report indicates the operations mode. The operations of 1320 may be performed in accordance with examples as disclosed herein. In some examples, aspects of the operations of 1320 may be performed by a load report manager 935 as described with reference to FIG. 9.

Figure 14:
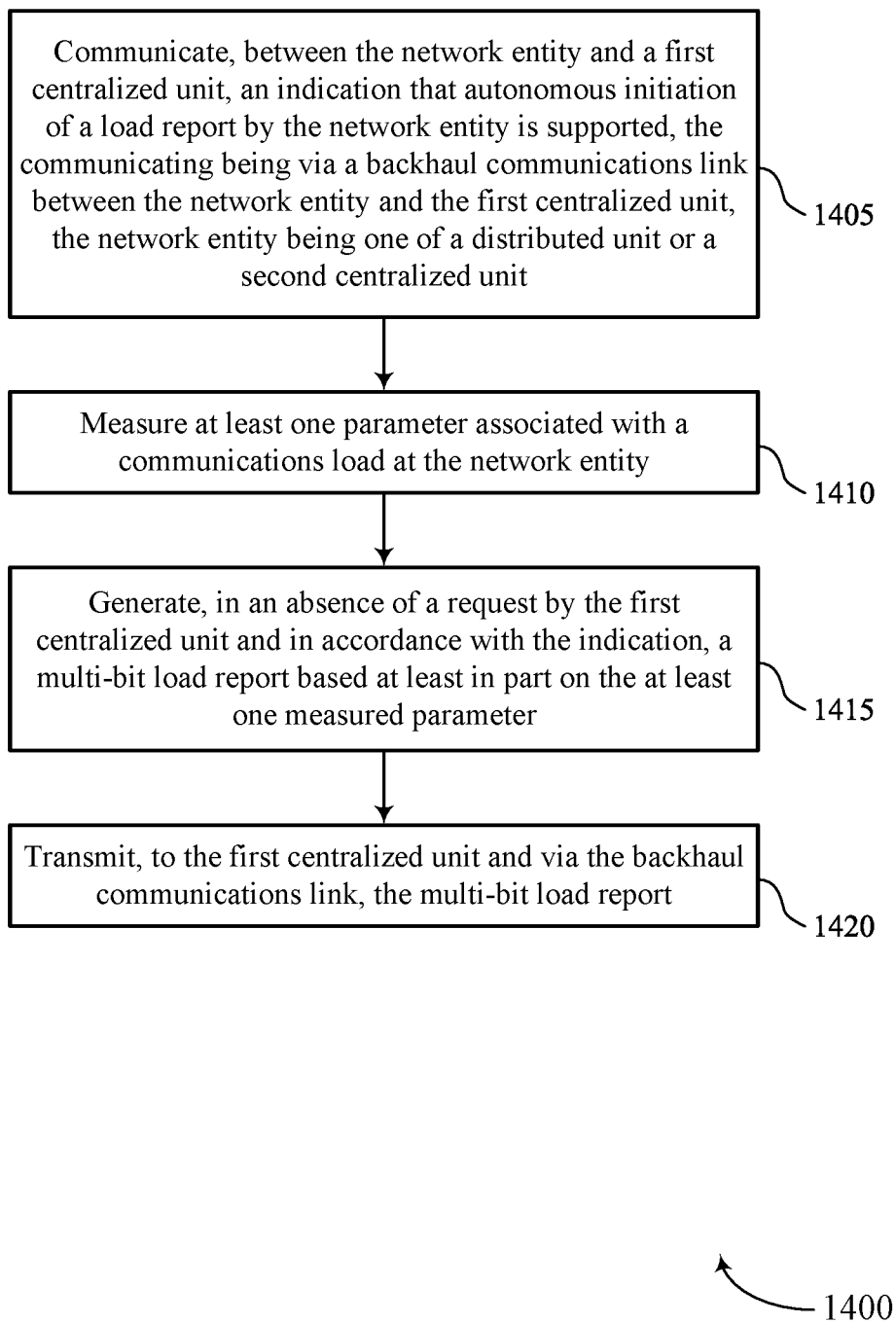

FIG. 14 shows a flowchart illustrating a method 1400 that supports load reporting in backhaul communications in accordance with one or more aspects of the present disclosure. The operations of the method 1400 may be implemented by a network entity or its components as described herein. For example, the operations of the method 1400 may be performed by a network entity as described with reference to FIGS. 1 through 10. In some examples, a network entity may execute a set of instructions to control the functional elements of the network entity to perform the described functions. Additionally, or alternatively, the network entity may perform aspects of the described functions using special-purpose hardware.

At 1405, the method may include communicating, between the network entity and a first CU, an indication that autonomous initiation of a load report by the network entity is supported, the communicating being via a backhaul communications link between the network entity and the first CU, the network entity being one of a DU or a second CU. The operations of 1405 may be performed in accordance with examples as disclosed herein. In some examples, aspects of the operations of 1405 may be performed by an autonomous load report capability manager 940 as described with reference to FIG. 9.

At 1410, the method may include measuring at least one parameter associated with a communications load at the network entity. The operations of 1410 may be performed in accordance with examples as disclosed herein. In some examples, aspects of the operations of 1410 may be performed by a load parameter measurement manager 930 as described with reference to FIG. 9.

At 1415, the method may include generating, in an absence of a request by the first CU and in accordance with the indication, a multi-bit load report based on the at least one measured parameter. The operations of 1415 may be performed in accordance with examples as disclosed herein. In some examples, aspects of the operations of 1415 may be performed by an autonomous load report generation manager 945 as described with reference to FIG. 9.

At 1420, the method may include transmitting, to the first CU and via the backhaul communications link, the multi-bit load report. The operations of 1420 may be performed in accordance with examples as disclosed herein. In some examples, aspects of the operations of 1420 may be performed by a load report manager 935 as described with reference to FIG. 9.

Figure 15:
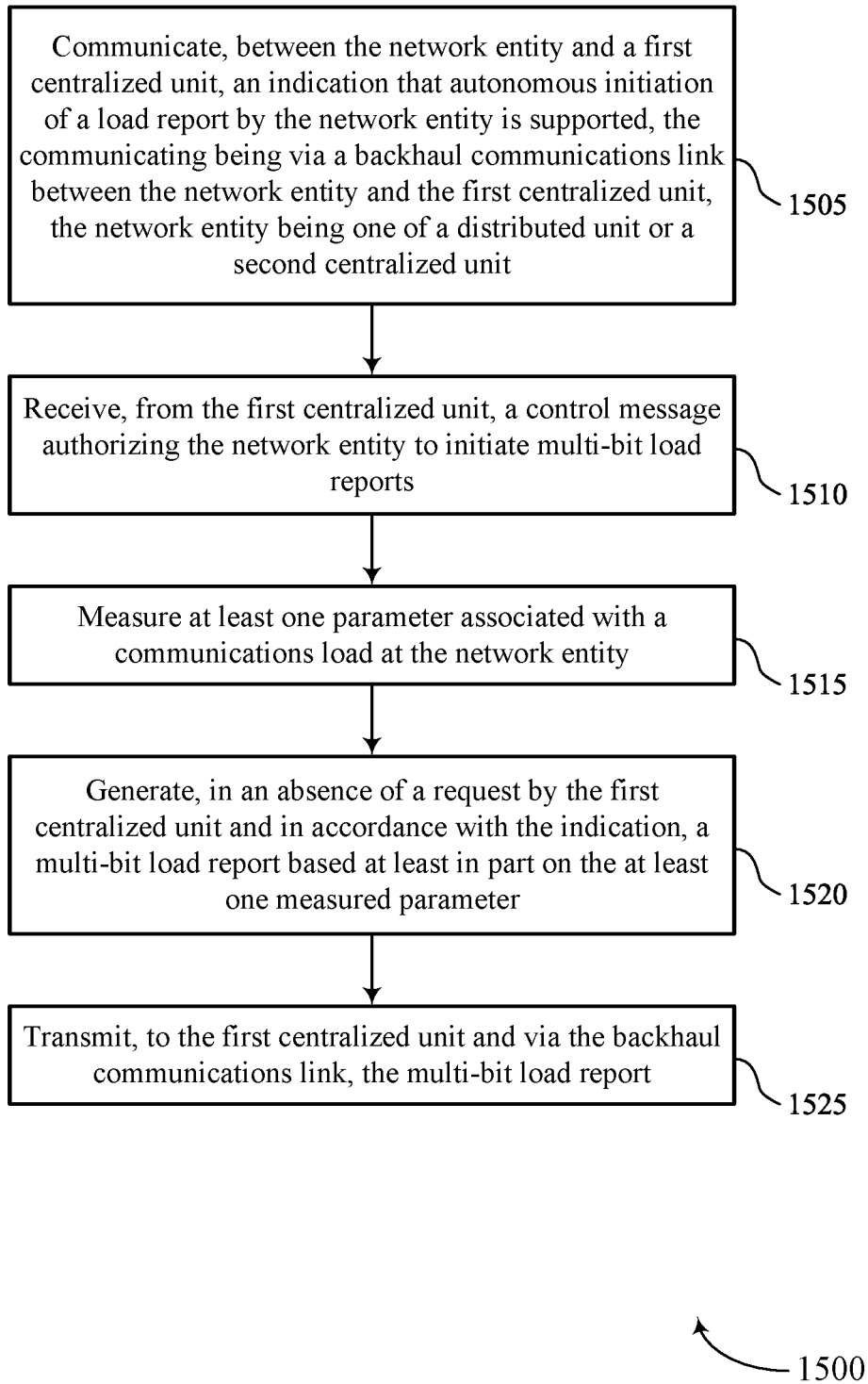

FIG. 15 shows a flowchart illustrating a method 1500 that supports load reporting in backhaul communications in accordance with one or more aspects of the present disclosure. The operations of the method 1500 may be implemented by a network entity or its components as described herein. For example, the operations of the method 1500 may be performed by a network entity as described with reference to FIGS. 1 through 10. In some examples, a network entity may execute a set of instructions to control the functional elements of the network entity to perform the described functions. Additionally, or alternatively, the network entity may perform aspects of the described functions using special-purpose hardware.

At 1505, the method may include communicating, between the network entity and a first CU, an indication that autonomous initiation of a load report by the network entity is supported, the communicating being via a backhaul communications link between the network entity and the first CU, the network entity being one of a DU or a second CU. The operations of 1505 may be performed in accordance with examples as disclosed herein. In some examples, aspects of the operations of 1505 may be performed by an autonomous load report capability manager 940 as described with reference to FIG. 9.

At 1510, the method may include receiving, from the first CU, a control message authorizing the network entity to initiate multi-bit load reports. The operations of 1510 may be performed in accordance with examples as disclosed herein. In some examples, aspects of the operations of 1510 may be performed by an autonomous load report authorization manager 970 as described with reference to FIG. 9.

At 1515, the method may include measuring at least one parameter associated with a communications load at the network entity. The operations of 1515 may be performed in accordance with examples as disclosed herein. In some examples, aspects of the operations of 1515 may be performed by a load parameter measurement manager 930 as described with reference to FIG. 9.

At 1520, the method may include generating, in an absence of a request by the first CU and in accordance with the indication, a multi-bit load report based on the at least one measured parameter. The operations of 1520 may be performed in accordance with examples as disclosed herein. In some examples, aspects of the operations of 1520 may be performed by an autonomous load report generation manager 945 as described with reference to FIG. 9.

At 1525, the method may include transmitting, to the first CU and via the backhaul communications link, the multi-bit load report. The operations of 1525 may be performed in accordance with examples as disclosed herein. In some examples, aspects of the operations of 1525 may be performed by a load report manager 935 as described with reference to FIG. 9.

Figure 16:
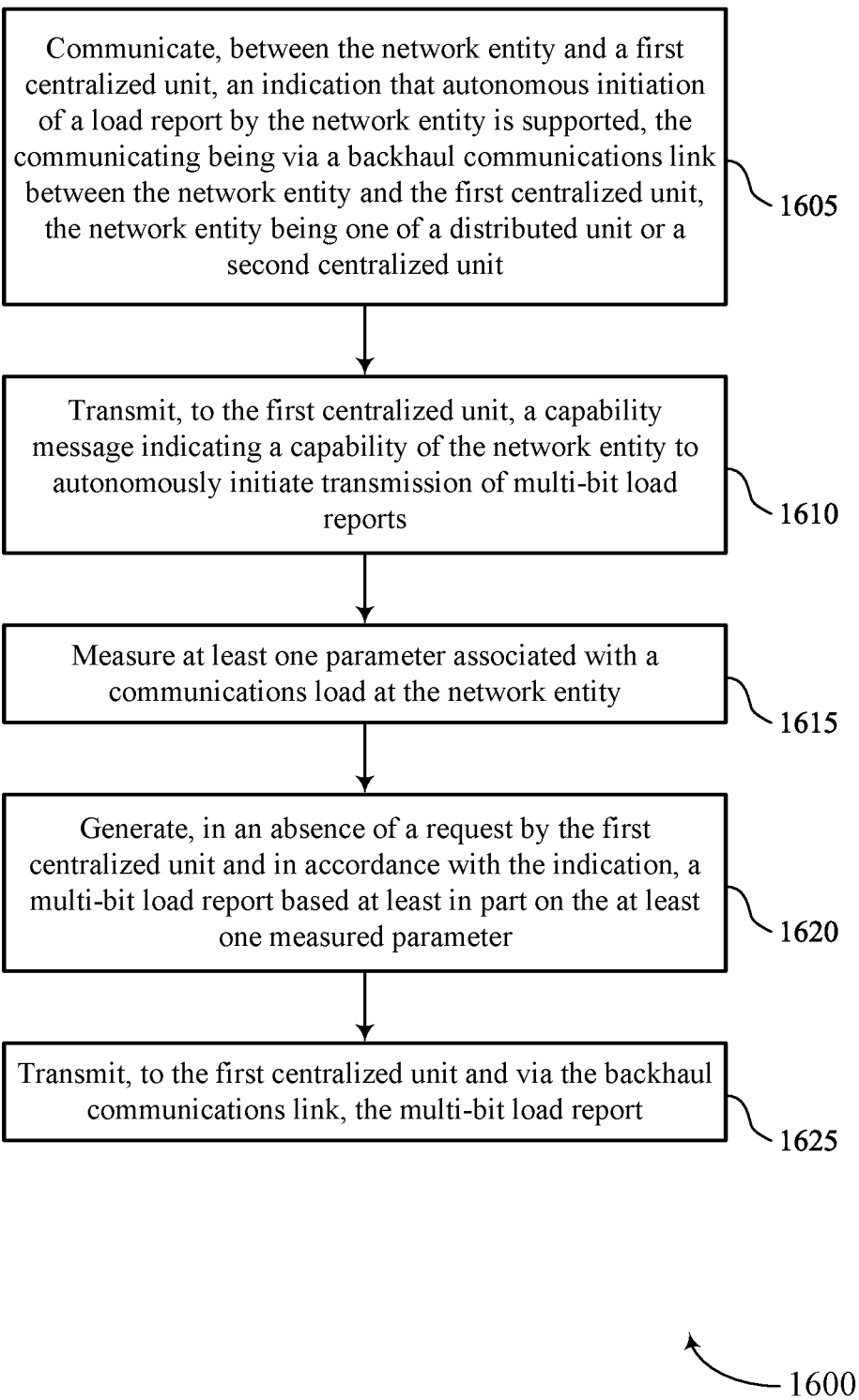

FIG. 16 shows a flowchart illustrating a method 1600 that supports load reporting in backhaul communications in accordance with one or more aspects of the present disclosure. The operations of the method 1600 may be implemented by a network entity or its components as described herein. For example, the operations of the method 1600 may be performed by a network entity as described with reference to FIGS. 1 through 10. In some examples, a network entity may execute a set of instructions to control the functional elements of the network entity to perform the described functions. Additionally, or alternatively, the network entity may perform aspects of the described functions using special-purpose hardware.

At 1605, the method may include communicating, between the network entity and a first CU, an indication that autonomous initiation of a load report by the network entity is supported, the communicating being via a backhaul communications link between the network entity and the first CU, the network entity being one of a DU or a second CU. The operations of 1605 may be performed in accordance with examples as disclosed herein. In some examples, aspects of the operations of 1605 may be performed by an autonomous load report capability manager 940 as described with reference to FIG. 9.

At 1610, the method may include transmitting, to the first CU, a capability message indicating a capability of the network entity to autonomously initiate transmission of multi-bit load reports. The operations of 1610 may be performed in accordance with examples as disclosed herein. In some examples, aspects of the operations of 1610 may be performed by an autonomous load report capability manager 940 as described with reference to FIG. 9.

At 1615, the method may include measuring at least one parameter associated with a communications load at the network entity. The operations of 1615 may be performed in accordance with examples as disclosed herein. In some examples, aspects of the operations of 1615 may be performed by a load parameter measurement manager 930 as described with reference to FIG. 9.

At 1620, the method may include generating, in an absence of a request by the first CU and in accordance with the indication, a multi-bit load report based on the at least one measured parameter. The operations of 1620 may be performed in accordance with examples as disclosed herein. In some examples, aspects of the operations of 1620 may be performed by an autonomous load report generation manager 945 as described with reference to FIG. 9.

At 1625, the method may include transmitting, to the first CU and via the backhaul communications link, the multi-bit load report. The operations of 1625 may be performed in accordance with examples as disclosed herein. In some examples, aspects of the operations of 1625 may be performed by a load report manager 935 as described with reference to FIG. 9.

Figure 17:
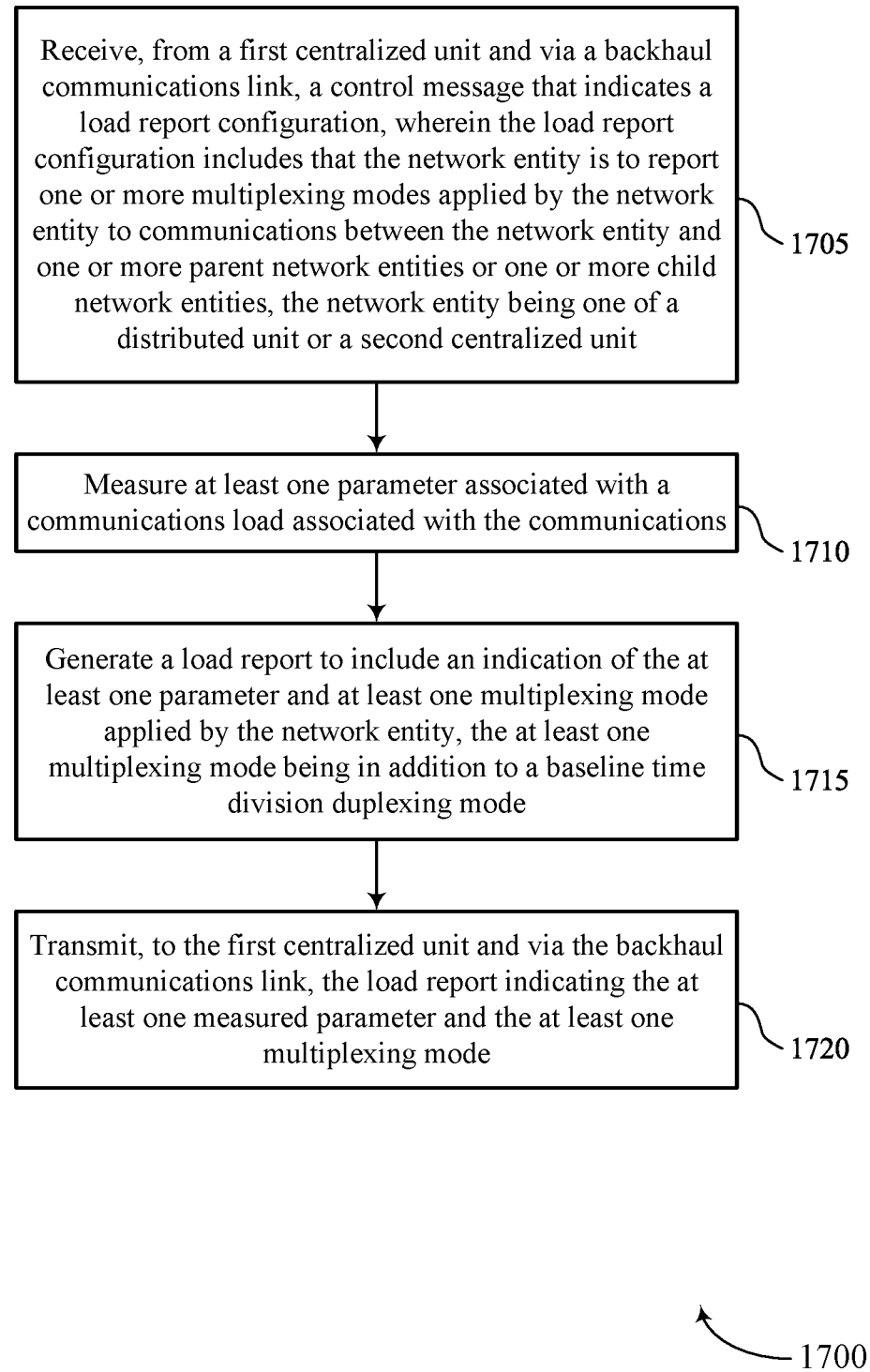

FIG. 17 shows a flowchart illustrating a method 1700 that supports load reporting in backhaul communications in accordance with one or more aspects of the present disclosure. The operations of the method 1700 may be implemented by a network entity or its components as described herein. For example, the operations of the method 1700 may be performed by a network entity as described with reference to FIGS. 1 through 10. In some examples, a network entity may execute a set of instructions to control the functional elements of the network entity to perform the described functions. Additionally, or alternatively, the network entity may perform aspects of the described functions using special-purpose hardware.

At 1705, the method may include receiving, from a first CU and via a backhaul communications link, a control message that indicates a load report configuration, where the load report configuration includes that the network entity is to report one or more multiplexing modes applied by the network entity to communications between the network entity and one or more parent network entities or one or more child network entities, the network entity being one of a DU or a second CU. The operations of 1705 may be performed in accordance with examples as disclosed herein. In some examples, aspects of the operations of 1705 may be performed by a load report configuration manager 950 as described with reference to FIG. 9.

At 1710, the method may include measuring at least one parameter associated with a communications load associated with the communications. The operations of 1710 may be performed in accordance with examples as disclosed herein. In some examples, aspects of the operations of 1710 may be performed by a load parameter measurement manager 930 as described with reference to FIG. 9.

At 1715, the method may include generating a load report to include an indication of the at least one parameter and at least one multiplexing mode applied by the network entity, the at least one multiplexing mode being in addition to a baseline TDD mode. The operations of 1715 may be performed in accordance with examples as disclosed herein. In some examples, aspects of the operations of 1715 may be performed by a multiplexing mode load report generation manager 955 as described with reference to FIG. 9.

At 1720, the method may include transmitting, to the first CU and via the backhaul communications link, the load report indicating the at least one measured parameter and the at least one multiplexing mode. The operations of 1720 may be performed in accordance with examples as disclosed herein. In some examples, aspects of the operations of 1720 may be performed by a load report manager 935 as described with reference to FIG. 9.

Figure 18:
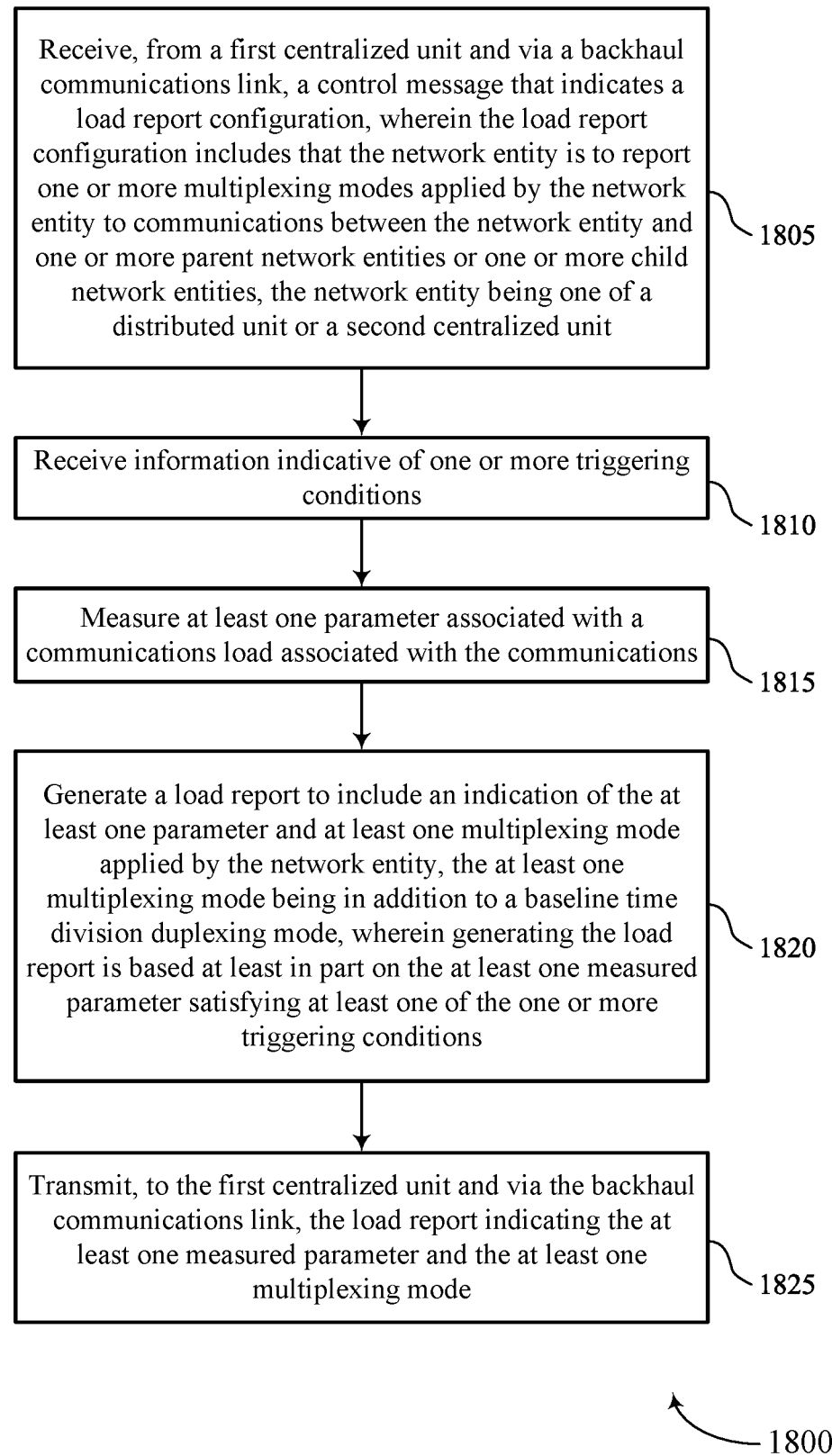

FIG. 18 shows a flowchart illustrating a method 1800 that supports load reporting in backhaul communications in accordance with one or more aspects of the present disclosure. The operations of the method 1800 may be implemented by a network entity or its components as described herein. For example, the operations of the method 1800 may be performed by a network entity as described with reference to FIGS. 1 through 10. In some examples, a network entity may execute a set of instructions to control the functional elements of the network entity to perform the described functions. Additionally, or alternatively, the network entity may perform aspects of the described functions using special-purpose hardware.

At 1805, the method may include receiving, from a first CU and via a backhaul communications link, a control message that indicates a load report configuration, where the load report configuration includes that the network entity is to report one or more multiplexing modes applied by the network entity to communications between the network entity and one or more parent network entities or one or more child network entities, the network entity being one of a DU or a second CU. The operations of 1805 may be performed in accordance with examples as disclosed herein. In some examples, aspects of the operations of 1805 may be performed by a load report configuration manager 950 as described with reference to FIG. 9.

At 1810, the method may include receiving information indicative of one or more triggering conditions. The operations of 1810 may be performed in accordance with examples as disclosed herein. In some examples, aspects of the operations of 1810 may be performed by a triggering condition manager 925 as described with reference to FIG. 9.

At 1815, the method may include measuring at least one parameter associated with a communications load associated with the communications. The operations of 1815 may be performed in accordance with examples as disclosed herein. In some examples, aspects of the operations of 1815 may be performed by a load parameter measurement manager 930 as described with reference to FIG. 9.

At 1820, the method may include generating a load report to include an indication of the at least one parameter and at least one multiplexing mode applied by the network entity, the at least one multiplexing mode being in addition to a baseline TDD mode, where generating the load report is based on the at least one measured parameter satisfying at least one of the one or more triggering conditions. The operations of 1820 may be performed in accordance with examples as disclosed herein. In some examples, aspects of the operations of 1820 may be performed by a multiplexing mode load report generation manager 955 as described with reference to FIG. 9.

At 1825, the method may include transmitting, to the first CU and via the backhaul communications link, the load report indicating the at least one measured parameter and the at least one multiplexing mode. The operations of 1825 may be performed in accordance with examples as disclosed herein. In some examples, aspects of the operations of 1825 may be performed by a load report manager 935 as described with reference to FIG. 9.

The following provides an overview of aspects of the present disclosure:

Aspect 1: A method for wireless communications at a network entity, comprising: receiving, from a first CU and via a backhaul communications link, a control message comprising an indication of one or more triggering conditions for reporting of a load report from the network entity to the first CU, the one or more triggering conditions comprising at least upper or lower parameter thresholds, the network entity being one of a DU or a second CU; measuring at least one parameter associated with a communications load at the network entity; and transmitting, to the first CU and via the backhaul communications link, based at least in part on the at least one measured parameter satisfying at least one of the upper or lower parameter thresholds of the one or more triggering conditions, the load report comprising the at least one measured parameter.

Aspect 2: The method of aspect 1, further comprising: receiving the indication of the one or more triggering conditions on a per cell basis, a per network slice basis, a per SSB basis, a per traffic type basis, or a per communication direction basis.

Aspect 3: The method of any of aspects 1 through 2, wherein measuring the at least one parameter comprises: measuring at least one of a hardware load, a transport network layer capacity, a composite capacity, a network slice availability, a communication resource availability, a physical resource block usage, or a number of active child network nodes.

Aspect 4: The method of any of aspects 1 through 3, wherein measuring the at least one parameter comprises: measuring the at least one parameter associated with one of a transmission and reception point of the network entity, a RU of the network entity, a repeater of the network entity, or a reflective surface of the network entity, and wherein the load report indicates the associated one of the transmission and reception point of the network entity, the RU of the network entity, the repeater of the network entity, or the reflective surface of the network entity.

Aspect 5: The method of any of aspects 1 through 4, wherein the network entity comprises an IAB node, and further comprising: receiving the indication of the one or more triggering conditions on a per access basis, a per backhaul basis, or a per access and backhaul basis.

Aspect 6: The method of any of aspects 1 through 5, wherein the network entity comprises an IAB node, and further comprising: transmitting, with the load report, first information indicative of first resources that are available and second information indicative of second resources that are conditionally available.

Aspect 7: The method of any of aspects 1 through 6, further comprising: receiving the indication of the one or more triggering conditions on a per bandwidth part basis, a per resource block basis, or a per resource block group basis.

Aspect 8: The method of any of aspects 1 through 7, wherein measuring the at least one parameter comprises: measuring the at least one parameter associated with the communications load associated with communications with a parent network entity and at least one child network entity in an operations mode comprising one of a set of enhanced multiplexing modes or a TDD mode, and wherein the load report indicates the operations mode.

Aspect 9: A method for wireless communications a network entity, comprising: communicating, between the network entity and a first CU, an indication that autonomous initiation of a load report by the network entity is supported, the communicating being via a backhaul communications link between the network entity and the first CU, the network entity being one of a DU or a second CU; measuring at least one parameter associated with a communications load at the network entity; generating, in an absence of a request by the first CU and in accordance with the indication, a multi-bit load report based at least in part on the at least one measured parameter; and transmitting, to the first CU and via the backhaul communications link, the multi-bit load report.

Aspect 10: The method of aspect 9, wherein communicating the indication that autonomous initiation of the load report by the network entity is supported further comprises: receiving, from the first CU, a control message authorizing the network entity to initiate multi-bit load reports.

Aspect 11: The method of any of aspects 9 through 10, wherein communicating the indication that autonomous initiation of the load report by the network entity is supported further comprises: transmitting, to the first CU, a capability message indicating a capability of the network entity to autonomously initiate transmission of multi-bit load reports.

Aspect 12: The method of any of aspects 9 through 11, wherein communicating the indication that autonomous initiation of the load report by the network entity is supported further comprises: receiving, from the first CU, a capability message indicating a capability of the first CU to receive multi-bit load reports autonomously initiated by the network entity.

Aspect 13: The method of any of aspects 9 through 12, further comprising: generating the multi-bit load report on a per cell basis, a per network slice basis, a per SSB basis, a per traffic type basis, or a per communication direction basis.

Aspect 14: The method of any of aspects 9 through 13, wherein measuring the at least one parameter comprises: measuring at least one of a hardware load, a transport network layer capacity, a composite capacity, a network slice availability, a communication resource availability, a physical resource block usage, or a number of active child network nodes.

Aspect 15: The method of any of aspects 9 through 14, wherein measuring the at least one parameter comprises: measuring the at least one parameter associated with one of a transmission and reception point of the network entity, a RU of the network entity, a repeater of the network entity, or a reflective surface of the network entity, and wherein the multi-bit load report indicates the associated one of the transmission and reception point of the network entity, the RU of the network entity, the repeater of the network entity, or the reflective surface of the network entity.

Aspect 16: The method of any of aspects 9 through 15, wherein the network entity comprises an IAB node, and further comprising: transmitting, with the multi-bit load report, first information indicative of first resources that are available and second information indicative of second resources that are conditionally available.

Aspect 17: The method of any of aspects 9 through 16, further comprising: generating the multi-bit load report on a per bandwidth part basis, a per resource block basis, or a per resource block group basis.

Aspect 18: The method of any of aspects 9 through 17, wherein measuring the at least one parameter comprises: measuring the at least one parameter associated with the communications load associated with communications with a parent network entity and at least one child network entity in an operations mode comprising one of a set of enhanced multiplexing modes or a TDD mode, and wherein the multi-bit load report indicates the operations mode.

Aspect 19: A method for wireless communications a network entity, comprising: receiving, from a first CU and via a backhaul communications link, a control message that indicates a load report configuration, wherein the load report configuration includes that the network entity is to report one or more multiplexing modes applied by the network entity to communications between the network entity and one or more parent network entities or one or more child network entities, the network entity being one of a DU or a second CU; measuring at least one parameter associated with a communications load associated with the communications; generating a load report to include an indication of the at least one parameter and at least one multiplexing mode applied by the network entity, the at least one multiplexing mode being in addition to a baseline TDD mode; and transmitting, to the first CU and via the backhaul communications link, the load report indicating the at least one measured parameter and the at least one multiplexing mode.

Aspect 20: The method of aspect 19, wherein receiving the control message comprises: receiving information indicative of one or more triggering conditions, wherein generating the load report is based at least in part on the at least one measured parameter satisfying at least one of the one or more triggering conditions.

Aspect 21: The method of aspect 20, further comprising: receiving the information indicative of the one or more triggering conditions on a per cell basis, a per network slice basis, a SSB block basis, a per traffic type basis, or a per communication direction basis.

Aspect 22: The method of any of aspects 20 through 21, wherein the network entity comprises an IAB node, and further comprising: receiving the information indicative of the one or more triggering conditions on a per access basis, a per backhaul basis, or a per access and backhaul basis.

Aspect 23: The method of any of aspects 20 through 22, further comprising: receiving the information indicative of the one or more triggering conditions on a per bandwidth part basis, a per resource block basis, or a per resource block group basis.

Aspect 24: The method of any of aspects 19 through 23, wherein measuring the at least one parameter comprises: measuring at least one of a hardware load, a transport network layer capacity, a composite capacity, a network slice availability, a communication resource availability, a physical resource block usage, or a number of active child network nodes.

Aspect 25: The method of any of aspects 19 through 24, wherein measuring the at least one parameter comprises: measuring the at least one parameter associated with one of a transmission and reception point of the network entity, a RU of the network entity, a repeater of the network entity, or a reflective surface of the network entity, and wherein the load report indicates the associated one of the transmission and reception point of the network entity, the RU of the network entity, the repeater of the network entity, or the reflective surface of the network entity.

Aspect 26: The method of any of aspects 19 through 25, wherein the network entity comprises an IAB node, and further comprising: transmitting, with the load report, first information indicative of first resources that are available and second information indicative of second resources that are conditionally available.

Aspect 27: The method of any of aspects 19 through 26, wherein measuring the at least one parameter comprises: measuring the at least one parameter associated with the communications load associated with communications with a parent network entity and at least one child network entity in an operations mode comprising one of a set of enhanced multiplexing modes or a TDD mode, and wherein the load report indicates the operations mode.

Aspect 28: An apparatus for wireless communications at a network entity, comprising a processor; memory coupled with the processor; and instructions stored in the memory and executable by the processor to cause the apparatus to perform a method of any of aspects 1 through 8.

Aspect 29: An apparatus for wireless communications at a network entity, comprising at least one means for performing a method of any of aspects 1 through 8.

Aspect 30: A non-transitory computer-readable medium storing code for wireless communications at a network entity, the code comprising instructions executable by a processor to perform a method of any of aspects 1 through 8.

Aspect 31: An apparatus for wireless communications a network entity, comprising a processor; memory coupled with the processor; and instructions stored in the memory and executable by the processor to cause the apparatus to perform a method of any of aspects 9 through 18.

Aspect 32: An apparatus for wireless communications a network entity, comprising at least one means for performing a method of any of aspects 9 through 18.

Aspect 33: A non-transitory computer-readable medium storing code for wireless communications a network entity, the code comprising instructions executable by a processor to perform a method of any of aspects 9 through 18.

Aspect 34: An apparatus for wireless communications a network entity, comprising a processor; memory coupled with the processor; and instructions stored in the memory and executable by the processor to cause the apparatus to perform a method of any of aspects 19 through 27.

Aspect 35: An apparatus for wireless communications a network entity, comprising at least one means for performing a method of any of aspects 19 through 27.

Aspect 36: A non-transitory computer-readable medium storing code for wireless communications a network entity, the code comprising instructions executable by a processor to perform a method of any of aspects 19 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a network entity, comprising:
   receiving, from a first centralized unit and via a backhaul communications link, a control message comprising an indication of one or more triggering conditions for reporting of a load report from the network entity to the first centralized unit, the one or more triggering conditions comprising at least upper or lower parameter thresholds, the network entity being one of a distributed unit or a second centralized unit;
   measuring at least one parameter associated with a communications load at the network entity; and
   transmitting, to the first centralized unit and via the backhaul communications link, based at least in part on the at least one measured parameter satisfying at least one of the upper or lower parameter thresholds of the one or more triggering conditions, the load report comprising the at least one measured parameter.

2. The method of claim 1, further comprising:
   receiving the indication of the one or more triggering conditions on a per cell basis, a per network slice basis, a per synchronization signal block basis, a per traffic type basis, or a per communication direction basis.

3. The method of claim 1, wherein measuring the at least one parameter comprises:
   measuring at least one of a hardware load, a transport network layer capacity, a composite capacity, a network slice availability, a communication resource availability, a physical resource block usage, or a number of active child network nodes.

4. The method of claim 1, wherein measuring the at least one parameter comprises:
   measuring the at least one parameter associated with one of a transmission and reception point of the network entity, a radio unit of the network entity, a repeater of the network entity, or a reflective surface of the network entity, and wherein the load report indicates the associated one of the transmission and reception point of the network entity, the radio unit of the network entity, the repeater of the network entity, or the reflective surface of the network entity.

5. The method of claim 1, wherein the network entity comprises an integrated access and backhaul node, and further comprising:
   receiving the indication of the one or more triggering conditions on a per access basis, a per backhaul basis, or a per access and backhaul basis.

6. The method of claim 1, wherein the network entity comprises an integrated access and backhaul node, and further comprising:
   transmitting, with the load report, first information indicative of first resources that are available and second information indicative of second resources that are conditionally available.

7. The method of claim 1, further comprising:
   receiving the indication of the one or more triggering conditions on a per bandwidth part basis, a per resource block basis, or a per resource block group basis.

8. The method of claim 1, wherein measuring the at least one parameter comprises:
   measuring the at least one parameter associated with the communications load associated with communications with a parent network entity and at least one child network entity in an operations mode comprising one of a set of enhanced multiplexing modes or a time division duplexing mode, and wherein the load report indicates the operations mode.

9. A method for wireless communications a network entity, comprising:
   communicating, between the network entity and a first centralized unit, an indication that autonomous initiation of a load report by the network entity is supported, the communicating being via a backhaul communications link between the network entity and the first centralized unit, the network entity being one of a distributed unit or a second centralized unit;
   measuring at least one parameter associated with a communications load at the network entity;
   generating, in an absence of a request by the first centralized unit and in accordance with the indication, a multi-bit load report based at least in part on the at least one measured parameter; and
   transmitting, to the first centralized unit and via the backhaul communications link, the multi-bit load report.

10. The method of claim 9, wherein communicating the indication that autonomous initiation of the load report by the network entity is supported further comprises:
    receiving, from the first centralized unit, a control message authorizing the network entity to initiate multi-bit load reports.

11. The method of claim 9, wherein communicating the indication that autonomous initiation of the load report by the network entity is supported further comprises:
    transmitting, to the first centralized unit, a capability message indicating a capability of the network entity to autonomously initiate transmission of multi-bit load reports.

12. The method of claim 9, wherein communicating the indication that autonomous initiation of the load report by the network entity is supported further comprises:
    receiving, from the first centralized unit, a capability message indicating a capability of the first centralized unit to receive multi-bit load reports autonomously initiated by the network entity.

13. The method of claim 9, further comprising:
    generating the multi-bit load report on a per cell basis, a per network slice basis, a per synchronization signal block basis, a per traffic type basis, or a per communication direction basis.

14. The method of claim 9, wherein measuring the at least one parameter comprises:
measuring at least one of a hardware load, a transport network layer capacity, a composite capacity, a network slice availability, a communication resource availability, a physical resource block usage, or a number of active child network nodes.

15. The method of claim 9, wherein measuring the at least one parameter comprises:
measuring the at least one parameter associated with one of a transmission and reception point of the network entity, a radio unit of the network entity, a repeater of the network entity, or a reflective surface of the network entity, and wherein the multi-bit load report indicates the associated one of the transmission and reception point of the network entity, the radio unit of the network entity, the repeater of the network entity, or the reflective surface of the network entity.

16. The method of claim 9, wherein the network entity comprises an integrated access and backhaul node, and further comprising:
transmitting, with the multi-bit load report, first information indicative of first resources that are available and second information indicative of second resources that are conditionally available.

17. The method of claim 9, further comprising:
generating the multi-bit load report on a per bandwidth part basis, a per resource block basis, or a per resource block group basis.

18. The method of claim 9, wherein measuring the at least one parameter comprises:
measuring the at least one parameter associated with the communications load associated with communications with a parent network entity and at least one child network entity in an operations mode comprising one of a set of enhanced multiplexing modes or a time division duplexing mode, and wherein the multi-bit load report indicates the operations mode.

19. A network entity, comprising:
a processor;
memory coupled with the processor; and
instructions stored in the memory and executable by the processor to cause the network entity to:
receive, from a first centralized unit and via a backhaul communications link, a control message comprising an indication of one or more triggering conditions for reporting of a load report from the network entity to the first centralized unit, the one or more triggering conditions comprising at least upper or lower parameter thresholds, the network entity being one of a distributed unit or a second centralized unit;
measure at least one parameter associated with a communications load at the network entity; and
transmit, to the first centralized unit and via the backhaul communications link, based at least in part on the at least one measured parameter satisfying at least one of the upper or lower parameter thresholds of the one or more triggering conditions, the load report comprising the at least one measured parameter.

20. The network entity of claim 19, wherein the instructions are further executable by the processor to cause the network entity to:
receive the indication of the one or more triggering conditions on a per cell basis, a per network slice basis, a per synchronization signal block basis, a per traffic type basis, or a per communication direction basis.

21. The network entity of claim 19, wherein the instructions to measure the at least one parameter are executable by the processor to cause the network entity to:
measure at least one of a hardware load, a transport network layer capacity, a composite capacity, a network slice availability, a communication resource availability, a physical resource block usage, or a number of active child network nodes.

22. The network entity of claim 19, wherein the instructions to measure the at least one parameter are executable by the processor to cause the network entity to:
measure the at least one parameter associated with one of a transmission and reception point of the network entity, a radio unit of the network entity, a repeater of the network entity, or a reflective surface of the network entity, and wherein the load report indicates the associated one of the transmission and reception point of the network entity, the radio unit of the network entity, the repeater of the network entity, or the reflective surface of the network entity.

23. The network entity of claim 19, wherein the instructions to are executable by the processor to cause the network entity to:
receive the indication of the one or more triggering conditions on a per access basis, a per backhaul basis, or a per access and backhaul basis.

24. The network entity of claim 19, wherein the instructions to are executable by the processor to cause the network entity to:
transmit, with the load report, first information indicative of first resources that are available and second information indicative of second resources that are conditionally available.

25. The network entity of claim 19, wherein the instructions are further executable by the processor to cause the network entity to:
receive the indication of the one or more triggering conditions on a per bandwidth part basis, a per resource block basis, or a per resource block group basis.

26. The network entity of claim 19, wherein the instructions to measure the at least one parameter are executable by the processor to cause the network entity to:
measure the at least one parameter associated with the communications load associated with communications with a parent network entity and at least one child network entity in an operations mode comprising one of a set of enhanced multiplexing modes or a time division duplexing mode, and wherein the load report indicates the operations mode.

27. A network entity, comprising:
a processor;
memory coupled with the processor; and
instructions stored in the memory and executable by the processor to cause the network entity to:
communicate, between the network entity and a first centralized unit, an indication that autonomous initiation of a load report by the network entity is supported, the communicating being via a backhaul communications link between the network entity and the first centralized unit, the network entity being one of a distributed unit or a second centralized unit;
measure at least one parameter associated with a communications load at the network entity;
generate, in an absence of a request by the first centralized unit and in accordance with the indication, a multi-bit load report based at least in part on the at least one measured parameter; and transmit, to the first centralized unit and via the backhaul communications link, the multi-bit load report.

28. The network entity of claim 27, wherein the instructions to communicate the indication that autonomous initiation of the load report by the network entity is supported are further executable by the processor to cause the network entity to:
receive, from the first centralized unit, a control message authorizing the network entity to initiate multi-bit load reports.

29. The network entity of claim 27, wherein the instructions to communicate the indication that autonomous initiation of the load report by the network entity is supported are further executable by the processor to cause the network entity to:
transmit, to the first centralized unit, a capability message indicating a capability of the network entity to autonomously initiate transmission of multi-bit load reports.

30. The network entity of claim 27, wherein the instructions to communicate the indication that autonomous initiation of the load report by the network entity is supported are further executable by the processor to cause the network entity to:
receive, from the first centralized unit, a capability message indicating a capability of the first centralized unit to receive multi-bit load reports autonomously initiated by the network entity.

\* \* \* \* \*